US009588318B2

(12) United States Patent
Chen et al.

(10) Patent No.: US 9,588,318 B2
(45) Date of Patent: Mar. 7, 2017

(54) IMAGE CAPTURING OPTICAL SYSTEM, IMAGE CAPTURING DEVICE AND PORTABLE DEVICE

(71) Applicant: LARGAN PRECISION CO., LTD., Taichung (TW)

(72) Inventors: Wei-Yu Chen, Taichung (TW); Chih-Wen Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 231 days.

(21) Appl. No.: 14/470,706

(22) Filed: Aug. 27, 2014

(65) Prior Publication Data

US 2015/0370042 A1    Dec. 24, 2015

(30) Foreign Application Priority Data

Jun. 20, 2014    (TW) .............................. 103121309 A

(51) Int. Cl.
| | |
|---|---|
| G02B 13/18 | (2006.01) |
| G02B 3/02 | (2006.01) |
| G02B 13/00 | (2006.01) |
| G02B 9/62 | (2006.01) |

(52) U.S. Cl.
CPC ............ *G02B 13/0045* (2013.01); *G02B 9/62* (2013.01)

(58) Field of Classification Search
CPC ............................... G02B 13/0045; G02B 9/62
USPC ......................................... 359/756, 757, 713
See application file for complete search history.

(56) References Cited

U.S. PATENT DOCUMENTS

| | | | |
|---|---|---|---|
| 8,310,767 | B2 | 11/2012 | Huang et al. |
| 8,385,006 | B2 | 2/2013 | Tsai et al. |
| 2012/0243108 | A1* | 9/2012 | Tsai ....................... G02B 13/18 |
| | | | 359/713 |

FOREIGN PATENT DOCUMENTS

| | | |
|---|---|---|
| JP | 201185733 A | 4/2011 |
| JP | 201410399 A | 1/2014 |
| JP | 201410400 A | 1/2014 |
| JP | 201410401 A | 1/2014 |
| JP | 201444372 A | 3/2014 |
| KR | 101025339 B1 | 3/2011 |
| TW | 201344237 A | 11/2013 |
| TW | 201411182 A | 3/2014 |
| TW | 201413284 A | 4/2014 |

* cited by examiner

*Primary Examiner* — Alicia M Harrington
(74) *Attorney, Agent, or Firm* — Locke Lord LLP; Tim Tingkang Xia, Esq.

(57) ABSTRACT

The present invention provides an image capturing optical system comprising: a positive first lens element having a convex object-side surface in a paraxial region; a second lens element with refractive power; a third lens element; a fourth lens element having a concave image-side surface in a paraxial region; a plastic fifth lens element having a concave image-side surface in a paraxial region, and the image-side surface has at least one convex shape in an off-axis region thereof; and a plastic sixth lens element w having a concave image-side surface in a paraxial region, and the image-side surface has at least one convex shape in an off-axis region thereof.

27 Claims, 24 Drawing Sheets

IMAGE CAPTURING OPTICAL SYSTEM, IMAGE CAPTURING DEVICE AND PORTABLE DEVICE

RELATED APPLICATIONS

This application claims priority to Taiwan Application Serial Number 103121309, filed Jun. 20, 2014, which is incorporated by reference herein in its entirety.

BACKGROUND

Technical Field

The present disclosure relates to an image capturing optical system. More particularly, the present disclosure relates to a compact image capturing optical system applicable to a portable device.

Description of Related Art

As personal electronic products nowadays are becoming more and more compact, the internal elements of the products are also required to be smaller in size than before. Except for the demand of miniaturization, the advanced semiconductor manufacturing technologies making the pixel size of sensors to be reduced have also urged compact optical systems evolve toward the field of higher megapixels. Therefore, there is also an increasing demand for compact optical systems featuring better image quality.

Due to the popularity of smart phones and tablet personal computers, the requirements for high resolution and image quality of present compact optical systems increase significantly; wherein, among other things, the compact optical systems with large stop and large sensing element are the major trend in the development. However, the enlargement in stop and sensing element usually results in the difficulties in aberration correction; therefore, those types of optical systems do need adopt more lens elements to achieve the requirement in image quality. Adopting more lens elements, on the other hand, causes a longer total optical length and is not desired for the current market trend of miniaturization.

To sum up, it is continuously a need for an image capturing optical system satisfying the demand of compactness, which is able to effectively correct the aberration for high image quality.

SUMMARY

According to one aspect of the present disclosure, an image capturing optical system comprising, in order from an object side to an image side: a first lens element with positive refractive power having a convex object-side surface in a paraxial region thereof; a second lens element with refractive power; a third lens element with refractive power; a fourth lens element with refractive power having a concave image-side surface in a paraxial region thereof; a fifth lens element with refractive power having a concave image-side surface in a paraxial region thereof; wherein both of an object-side surface and the image-side surface of the fifth lens element are aspheric, the fifth lens element is made of plastic, and the image-side surface thereof has at least one convex shape in an off-axis region thereof; and a sixth lens element with refractive power having a concave image-side surface in a paraxial region thereof; wherein both of an object-side surface and the image-side surface of the sixth lens element are aspheric, the sixth lens element is made of plastic, and the image-side surface thereof has at least one convex shape in an off-axis region thereof; wherein the image capturing optical system has a total of six lens elements with refractive power; wherein an axial distance between the third lens element and the fourth lens element is T34, a central thickness of the fifth lens element is CT5, a curvature radius of the object-side surface of the sixth lens element is R11, a curvature radius of the image-side surface of the sixth lens element is R12, a sum of the central thicknesses of the first lens element, the second lens element, the third lens element, the fourth lens element, the fifth lens element, and the sixth lens element is $\Sigma CT$, an axial distance between the object-side surface of the first lens element and the image-side surface of the sixth lens element is Td, and the following conditions are satisfied:

$0.70 < T34/CT5;$ $-0.30 < (R11+R12)/(R11-R12);$ and $0.55 < \Sigma CT/Td < 0.95.$ According to another aspect of the present disclosure, an image capturing optical system comprising, in order from an object side to an image side: a first lens element with positive refractive power having a convex object-side surface in a paraxial region thereof; a second lens element with refractive power having a concave image-side surface in a paraxial region thereof; a third lens element with refractive power; a fourth lens element with refractive power having a concave image-side surface in a paraxial region thereof; a fifth lens element with refractive power having a convex object-side surface in a paraxial region thereof and a concave image-side surface in a paraxial region thereof; wherein both of the object-side surface and the image-side surface of the fifth lens element are aspheric, the fifth lens element is made of plastic, and the image-side surface thereof has at least one convex shape in an off-axis region thereof; and a sixth lens element with refractive power having a concave image-side surface in a paraxial region thereof; wherein both of an object-side surface and the image-side surface of the sixth lens element are aspheric, the sixth lens element is made of plastic, and the image-side surface thereof has at least one convex shape in an off-axis region thereof; wherein the image capturing optical system has a total of six lens elements with refractive power; wherein an axial distance between the third lens element and the fourth lens element is T34, a central thickness of the fifth lens element is CT5, a curvature radius of the object-side surface of the sixth lens element is R11, a curvature radius of the image-side surface of the sixth lens element is R12, a sum of the central thicknesses of the first lens element, the second lens element, the third lens element, the fourth lens element, the fifth lens element, and the sixth lens element is $\Sigma CT$, an axial distance between the object-side surface of the first lens element and the image-side surface of the sixth lens element is Td, and the following conditions are satisfied:

$0.50 < T34/CT5;$ $-0.30 < (R11+R12)/(R11-R12);$ and $0.55 < \Sigma CT/Td < 0.95.$ According to yet another aspect of the present disclosure, an image capturing device includes the image capturing optical system according to the aforementioned aspect and an image sensor, wherein the image sensor is located on an image surface of the image capturing optical system.

According to still yet another aspect of the present disclosure, a portable device includes the image capturing device according to the aforementioned aspect.

When the aforesaid condition of T34/CT5 is satisfied, it is favorable for avoiding the lens element from being deformed during manufacturing so as to improve the manufacturing yield rate.

When the aforesaid condition of (R11+R12)/(R11−R12) is satisfied, it is favorable for correcting the aberration of the system so as to improve the image quality.

When the aforesaid condition of ΣCT/Td is satisfied, the internal space of the system can be arranged more effectively in order to obtain a proper total track length.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
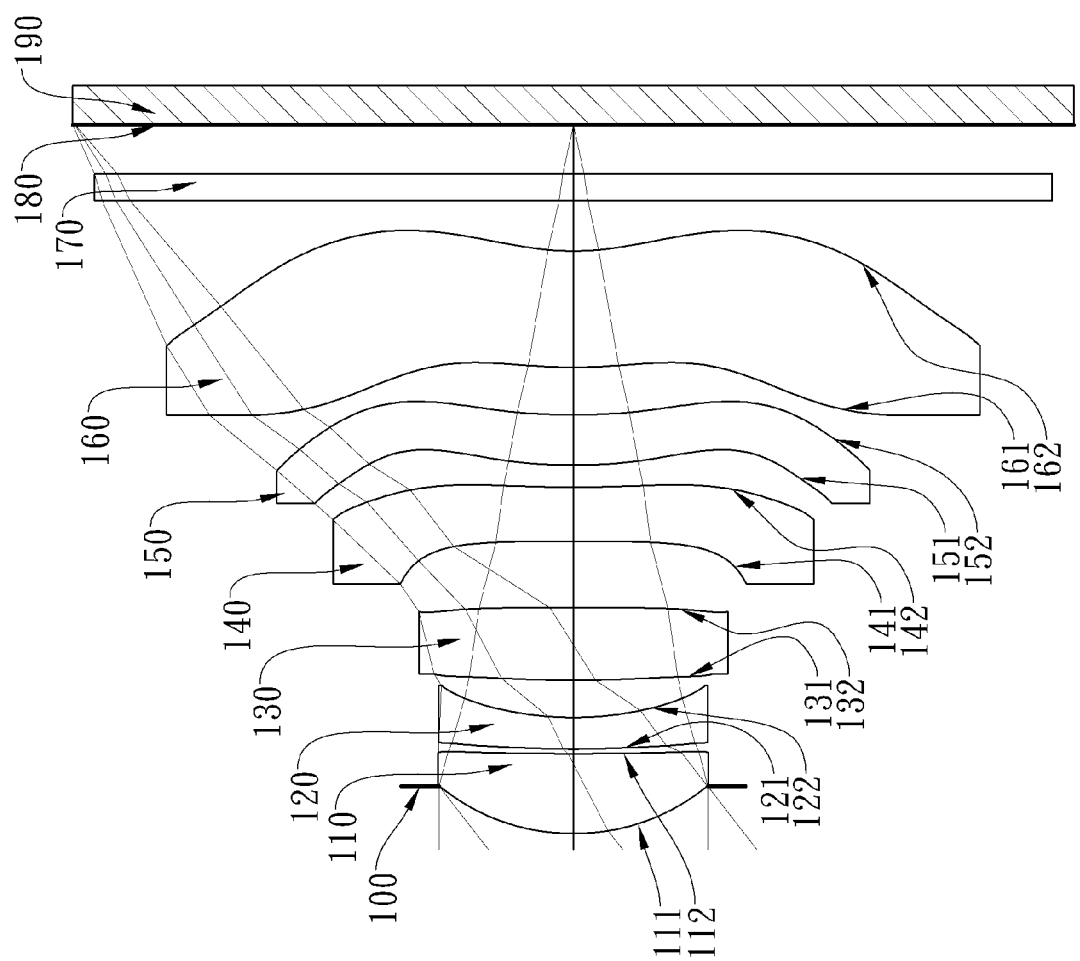
FIG. 1A is a schematic view of an image capturing device according to the 1st embodiment of the present disclosure.

An image capturing optical system includes, in order from an object side to an image side, a first lens element, a second lens element, a third lens element, a fourth lens element, a fifth lens element, and a sixth lens element. The image capturing optical system has a total of six lens elements with refractive power.

The first lens element has positive refractive power, so that it provides the image capturing optical system with the positive refractive power as it needs to be so as to reduce the total track length of the image capturing optical system. The first lens element has a convex object-side surface in a paraxial region thereof, so that it is favorable for adjusting the arrangement of the positive refractive power and for further reducing the total track length.

The second lens element may have negative refractive power, so that it is favorable for correcting the aberration created by the first lens element. The second lens element may have a concave image-side surface in a paraxial region thereof so that the astigmatism of the system can be effectively corrected and the image quality can be improved.

The fourth lens element may have a concave image-side surface in a paraxial region thereof, which is favorable for correcting the aberration and improving the image quality of the system.

The fifth lens element may have a convex object-side surface in a paraxial region thereof and a concave image-side surface in a paraxial region thereof so that the correction of astigmatism can be improved. The image-side surface of the fifth lens element has at least one convex shape in an off-axis region thereof so that the off-axis aberration can be effectively corrected.

The sixth lens element may have a convex object-side surface in a paraxial region thereof and a concave image-side surface in a paraxial region thereof, which is favorable for correcting the astigmatism of the system. The image-side surface of the sixth lens element has at least one convex shape in an off-axis region thereof so that the back focal length of the system can be favorably compressed to keep the system compact.

When an axial distance between the third lens element and the fourth lens element is T34, a central thickness of the fifth lens element is CT5, and the following condition is satisfied: $0.70<T34/CT5$, it is favorable for avoiding the lens element from being deformed during manufacturing so as to improve the manufacturing yield rate; preferably, the following condition is satisfied: $0.50<T34/CT5$; more preferably, the following condition is satisfied: $1.0<T34/CT5<3.0$; even more preferably, the following condition is satisfied: $1.25<T34/CT5<2.50$.

When a curvature radius of the object-side surface of the sixth lens element is R11, a curvature radius of the image-side surface of the sixth lens element is R12, and the following condition is satisfied: $-0.30<(R11+R12)/(R11-R12)$, it is favorable for correcting the aberration of the system so as to improve the image quality; more preferably, the following condition is satisfied: $2.0<(R11+R12)/(R11-R12)$.

When a sum of the central thicknesses of the first lens element, the second lens element, the third lens element, the fourth lens element, the fifth lens element, and the sixth lens element is $\Sigma CT$, an axial distance between the object-side surface of the first lens element and the image-side surface of the sixth lens element is Td, and the following condition is satisfied: $0.55<\Sigma CT/Td<0.95$, the internal space of the system can be arranged more effectively in order to obtain a proper total track length.

When the curvature radius of the image-side surface of the sixth lens element is R12, a curvature radius of the image-side surface of the fifth lens element is R10, a curvature radius of the image-side surface of the fourth lens element is R8, and the following condition is satisfied: $0<R12<R10<R8$, the correction of aberration of the system can be enhanced so that the image quality thereof can be improved.

When an Abbe number of the fifth lens element is V5, and the following condition is satisfied: $V5<32$, it is favorable for correcting the chromatic aberration of the system.

When a focal length of the image capturing optical system is f, an axial distance between the fifth lens element and the six lens element is T56, and the following condition is satisfied: $12.5<f/T56<25.0$, it is favorable to reduce the total track length of the system and also retain good image quality.

When the image capturing optical system further comprises a stop, an axial distance from the stop to the image-side surface of the sixth lens element is Sd, an axial distance between the object-side surface of the first lens element and the image-side surface of the sixth lens element is Td, and the following condition is satisfied: $0.80<Sd/Td<1.10$, it is favorable to obtain a balance between telecentricity and wide field of view.

When the central thickness of the fifth lens element is CT5, a central thickness of the sixth lens element is CT6, and the following condition is satisfied: $0.25<CT5/CT6<0.75$, the thickness of the lens elements is more proper for the manufacturing and assembly of the lens elements.

When an f-number of the image capturing optical system is Fno and the following condition is satisfied: $1.6<Fno<2.5$, it is favorable for improving the illumination in a peripheral region of the image capturing optical system.

When the axial distance between the object-side surface of the first lens element and the image-side surface of the sixth lens element is Td, a half of the maximal field of view of the image capturing optical system is HFOV, and the following condition is satisfied: $4.0\ mm<Td/Tan(HFOV)<7.5\ mm$, the system can favorably obtain the properties of wide field of view and short total track length.

When a focal length of the second lens element is f2, a focal length of any of the third lens element, the fourth lens element, the fifth lens element, and the sixth lens element is fx (i.e. x=3, 4, 5, or 6), and the following condition is satisfied: $|f2|<|fx|$, the arrangement of the refractive power is more proper for balancing between the refractive power arrangement and the desired total track length.

When a vertical distance between an optical axis and a critical point being the closest to an image surface and on the off-axis region of the image-side surface of the sixth lens element is Yc62, a vertical distance between an optical axis and a critical point being the closest to the image surface and on the off-axis region of the image-side surface of the fifth lens element is Yc52, and the following condition is satisfied: $Yc62>Yc52$, it is favorable for reducing the incident angle of the light projecting onto an image sensor so as to increase the responding efficiency of the image sensor.

According to the image capturing optical system of the present disclosure, the lens elements thereof can be made of glass or plastic material. When the lens elements are made of glass material, the distribution of the refractive power of the image capturing optical system may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surfaces so as to have more controllable variables for eliminating the aberration thereof, and to further decrease the required number of the lens elements. Therefore, the total track length of the image capturing optical system can also be reduced.

According to the image capturing optical system of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing optical system of the present disclosure, the image capturing optical system can include at least one stop, such as an aperture stop, a glare stop or a field stop. Said glare stop or said field stop is for eliminating the stray light and thereby improving the image resolution thereof.

According to the image capturing optical system of the present disclosure, an aperture stop can be configured as a front stop or a middle stop. A front stop disposed between an imaged object and the first lens element can provide a longer distance between an exit pupil of the image capturing optical system and the image surface and thereby improves the image-sensing efficiency of an image sensor. A middle stop disposed between the first lens element and the image surface is favorable for enlarging the field of view of the image capturing optical system and thereby provides a wider field of view for the same.

Figure 11:
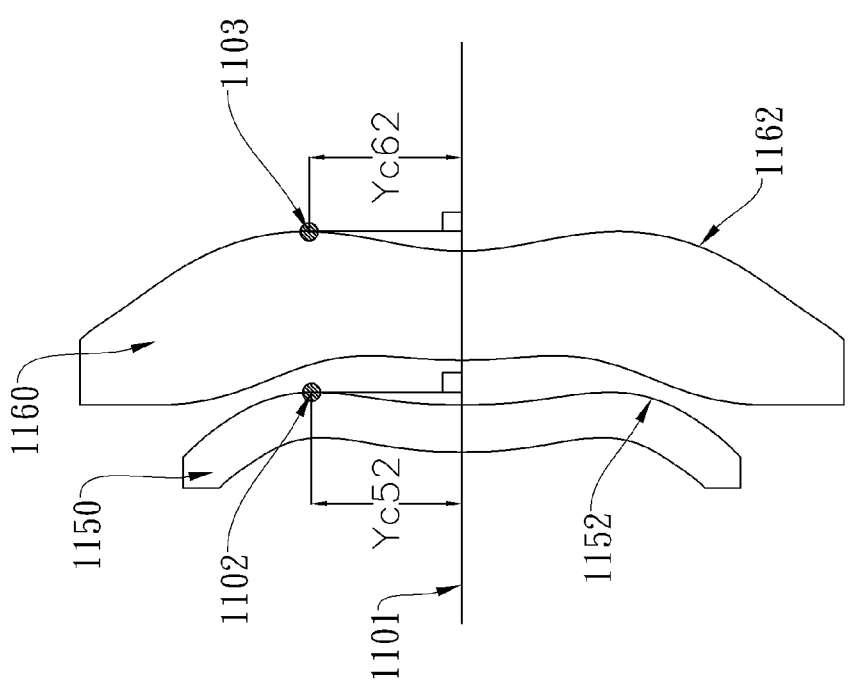
FIG. 11 shows the distance defined as Yc52 and Yc62 of the present invention.

Please refer to the FIG. 11 of the present invention, which shows the distance defined as Yc52 and Yc62 of the present invention. As shown in the embodiment of FIG. 11, a vertical distance between an optical axis 1101 and a critical point 1102 being the closest to the image surface and on the off-axis region of the image-side surface 1152 of the fifth lens element 1150 is Yc52; a vertical distance between an optical axis 1101 and a critical point 1103 being the closest to an image surface and on the off-axis region of the image-side surface 1162 of the sixth lens element 1160 is Yc62. Said critical point on a surface of a lens element is referred as a tangential point on a surface of the lens element concerned where the corresponding tangent through the critical point is perpendicular to the optical axis.

The present image capturing optical system can be optionally applied to moving focus optical systems. According to the image capturing optical system of the present disclosure, the image capturing optical system is featured with good correction ability and high image quality, and can be applied to 3D (three-dimensional) image capturing applications, in products such as digital cameras, mobile devices, digital tablets, wearable devices and other portable devices.

According to the present disclosure, an image capturing device is provided. The image capturing device includes the image capturing optical system according to the aforementioned image capturing optical system of the present disclosure, and an image sensor, wherein the image sensor is disposed on an image surface of the aforementioned image capturing optical system. As a result, it is favorable for reducing the total track length of the image capturing optical system while obtaining large field of view. Furthermore, it is also favorable for improving the resolving power and illumination so as to achieve the best image quality. Preferably, the image capturing device can further include a barrel member, a holding member or a combination thereof.

According to the present disclosure, a portable device is provided, wherein the portable device includes the aforementioned image capturing device. The image capturing device includes the image capturing optical system according to the aforementioned image capturing optical system of the present disclosure, and the image sensor, wherein the image sensor is disposed on an image surface of the aforementioned image capturing optical system. As a result, it is favorable for reducing the total track length of the image capturing optical system while obtaining large field of view. Furthermore, it is also favorable for improving the resolving power and illumination so as to achieve the best image quality.

Figure 12A:
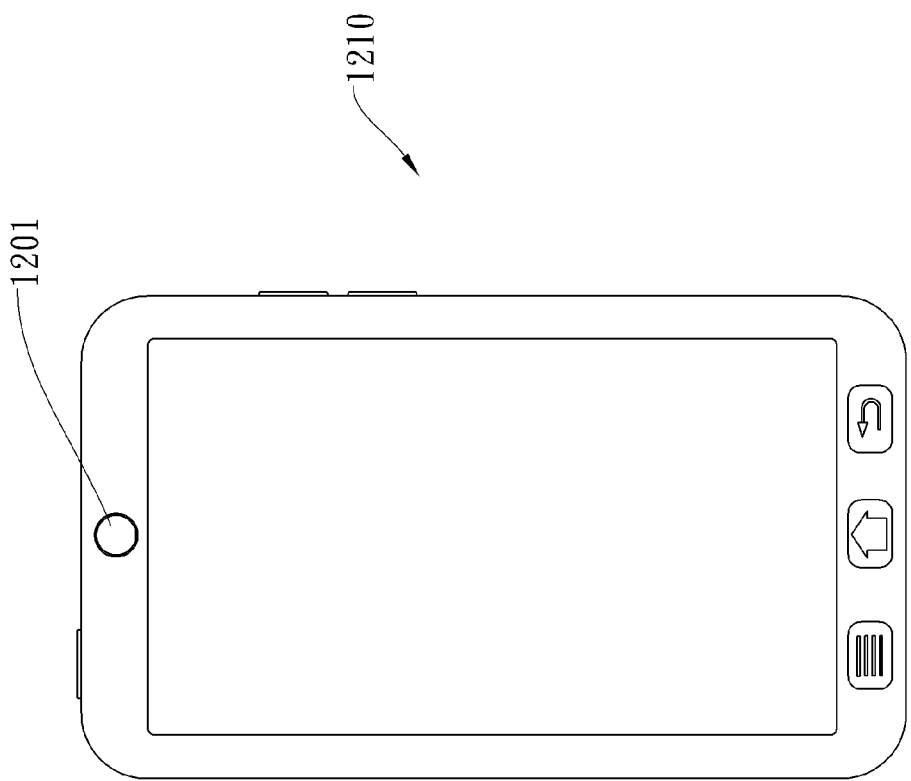
FIG. 12A shows a smart phone with an image capturing device of the present disclosure installed therein.
Figure 12B:
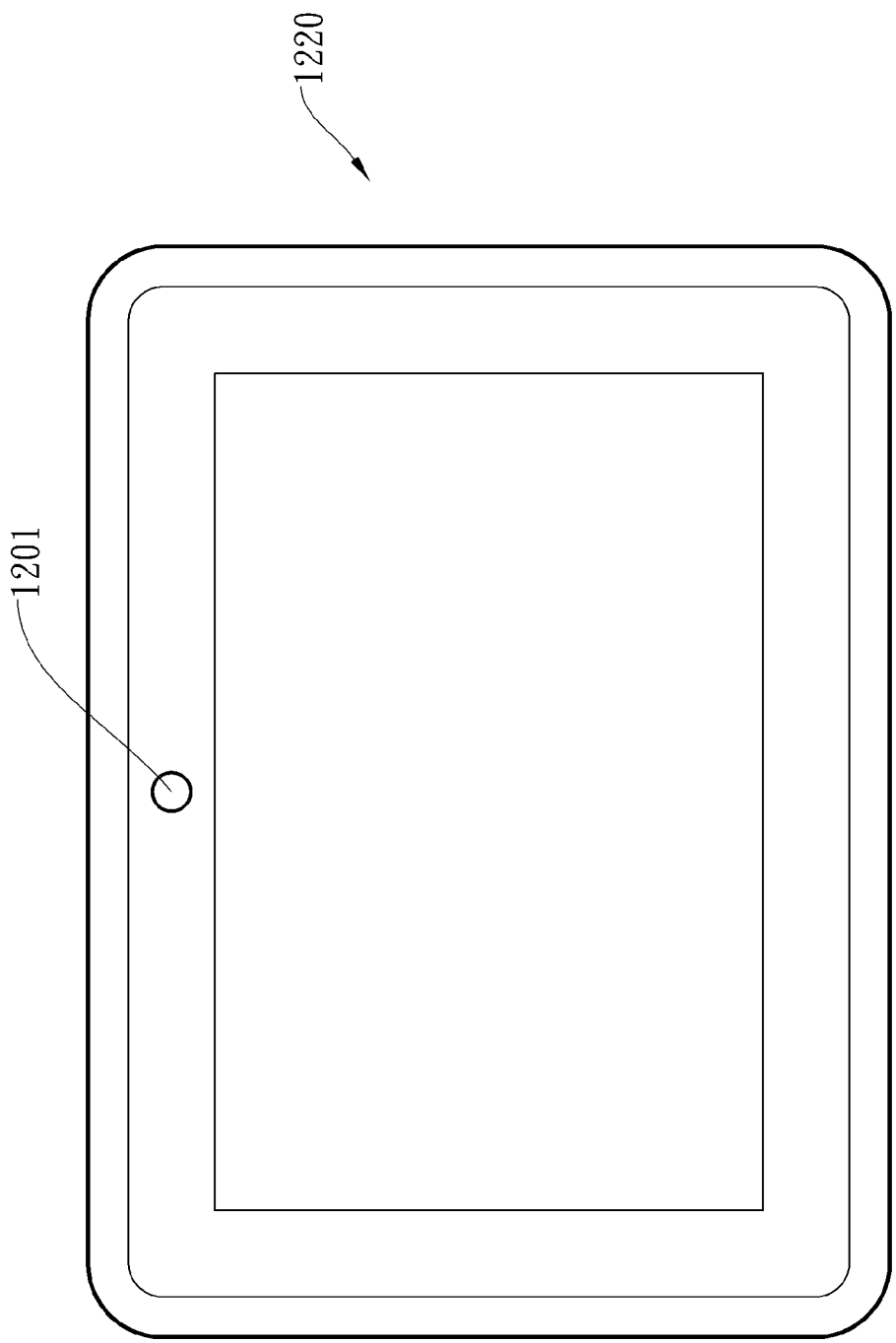
FIG. 12B shows a tablet personal computer with an image capturing device of the present disclosure installed therein.
Figure 12C:
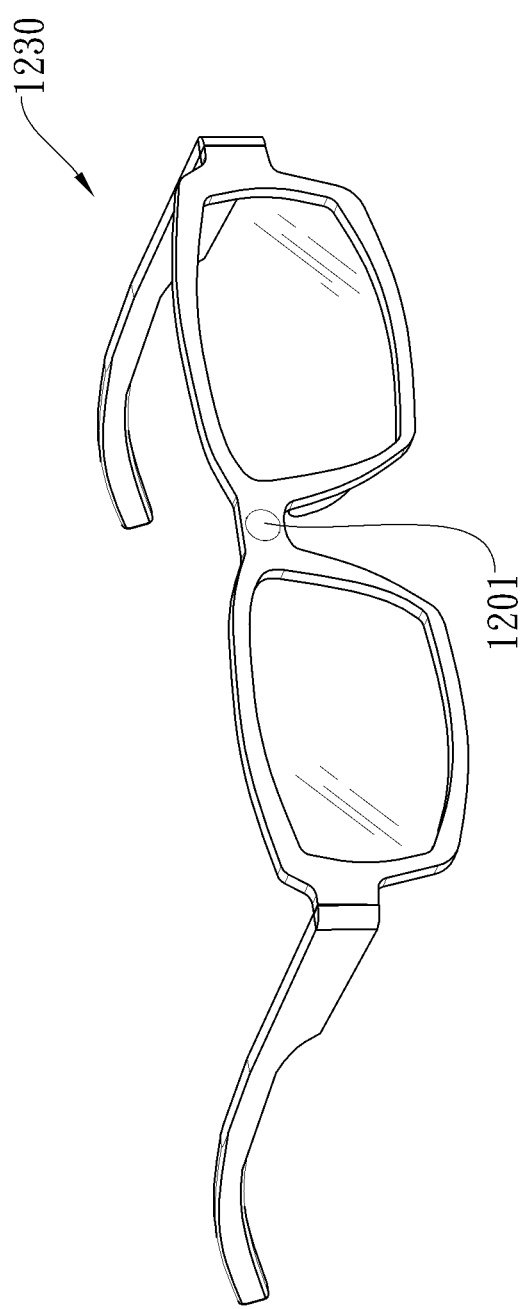
FIG. 12C shows a wearable device with an image capturing device of the present disclosure installed therein.

In FIG. 12A, FIG. 12B and FIG. 12C, an image capturing device 1201 may be installed in but not limited to a portable device, including a smart phone 1210, a tablet personal computer 1220 or a wearable device 1230. The three exemplary figures of different kinds of portable device are only exemplary for showing the image capturing device of present disclosure installing in a portable device and is not limited thereto. Preferably, the portable device can further include but not limited to display, control unit, random access memory unit (RAM) a read only memory unit (ROM) or a combination thereof.

According to the above description of the present disclosure, the following 1st-10th specific embodiments are provided for further explanation.

1st Embodiment

Figure 1B:
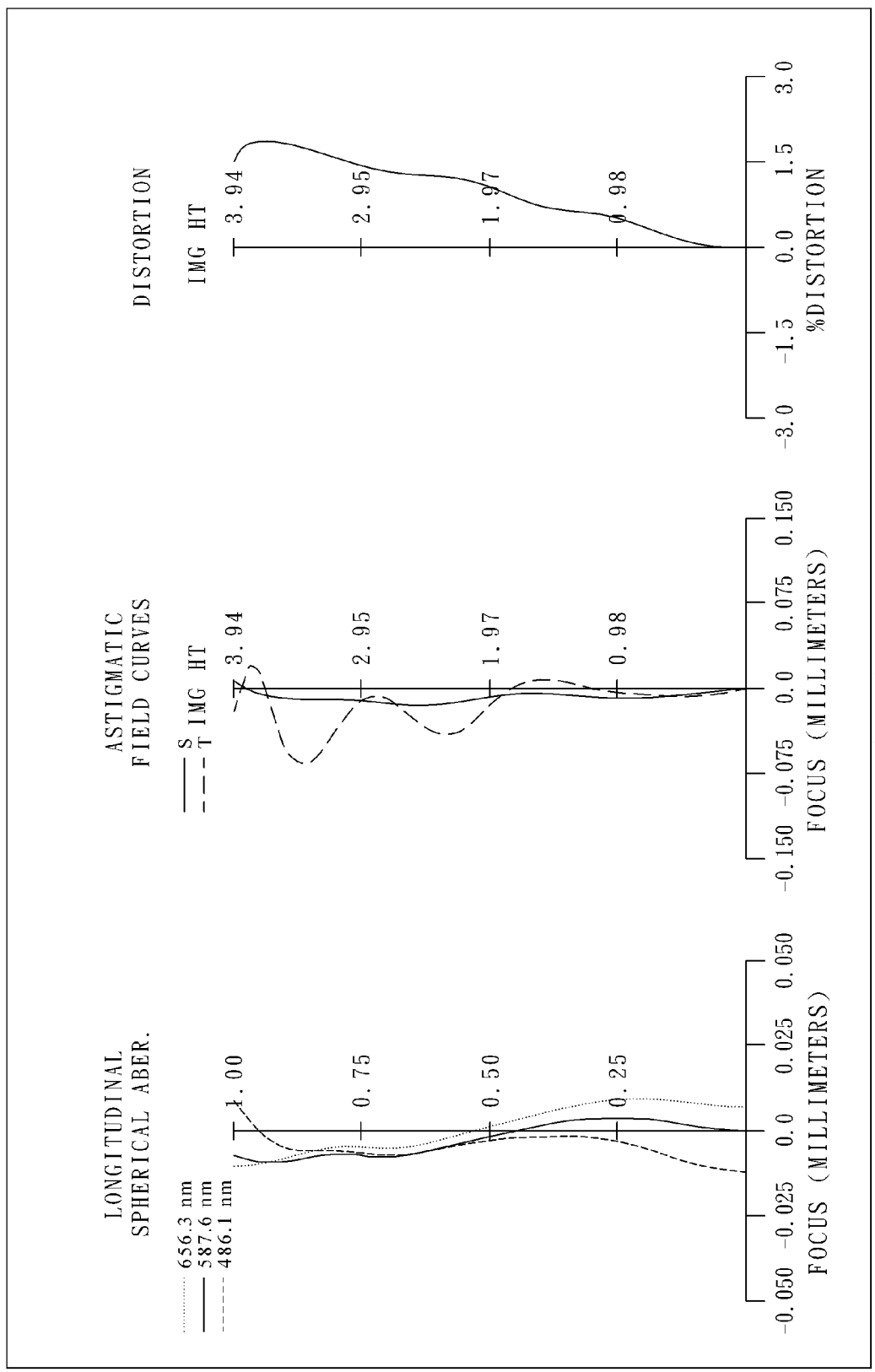
FIG. 1B shows spherical aberration curves, astigmatic field curves and a distortion curve of the image capturing device according to the 1st embodiment.

FIG. 1A is a schematic view of an image capturing device according to the 1st embodiment of the present disclosure. FIG. 1B shows, in order from left to right, spherical aberration curves, astigmatic field curves and a distortion curve of the image capturing device according to the 1st embodiment.

In FIG. 1A, the image capturing device includes the image capturing optical system (not otherwise herein labeled) of the present disclosure and an image sensor 190. The image capturing optical system includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the image capturing optical system has a total of six lens elements (110-160) with refractive power.

The first lens element 110 with positive refractive power has a convex object-side surface 111 in a paraxial region thereof and a concave image-side surface 112 in a paraxial region thereof, which are both aspheric, and the first lens element 110 is made of plastic material.

The second lens element 120 with negative refractive power has a convex object-side surface 121 in a paraxial region thereof and a concave image-side surface 122 in a paraxial region thereof, which are both aspheric, and the second lens element 120 is made of plastic material.

The third lens element 130 with positive refractive power has a convex object-side surface 131 in a paraxial region thereof and a concave image-side surface 132 in a paraxial region thereof, which are both aspheric, and the third lens element 130 is made of plastic material.

The fourth lens element 140 with negative refractive power has a convex object-side surface 141 in a paraxial region thereof and a concave image-side surface 142 in a paraxial region thereof, which are both aspheric, and the fourth lens element 140 is made of plastic material.

The fifth lens element 150 with positive refractive power has a convex object-side surface 151 in a paraxial region thereof and a concave image-side surface 152 in a paraxial region thereof, which are both aspheric, and the fifth lens element 150 is made of plastic material. Furthermore, the image-side surface 152 of the fifth lens element 150 has at least one convex shape in an off-axis region thereof.

The sixth lens element 160 with negative refractive power has a convex object-side surface 161 in a paraxial region thereof and a concave image-side surface 162 in a paraxial region thereof, which are both aspheric, and the sixth lens element 160 is made of plastic material. Furthermore, the image-side surface 162 of the sixth lens element 160 has at least one convex shape in an off-axis region thereof.

The IR-cut filter 170 is made of glass and located between the sixth lens element 160 and the image surface 180, and will not affect the focal length of the image capturing optical system. The image sensor 190 is disposed on the image surface 180 of the image capturing optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing optical system of the image capturing device according to the 1st embodiment, when a focal length of the image capturing optical system is f, an f-number of the image capturing optical system is Fno, and half of a maximal field of view of the image capturing optical system is HFOV, these parameters have the following values: f=4.98 mm; Fno=2.35; and HFOV=37.9 degrees.

In the image capturing optical system of the image capturing device according to the 1st embodiment, when an Abbe number of the fifth lens element 150 is V5, the following condition is satisfied: V5=30.2.

In the image capturing optical system according to the 1st embodiment, when an axial distance between the third lens element 130 and the fourth lens element 140 is T34, a central thickness of the fifth lens element 150 is CT5, and the following condition is satisfied: T34/CT5=1.32.

In the image capturing optical system according to the 1st embodiment, when a central thickness of the fifth lens element 150 is CT5, a central thickness of the sixth lens element 160 is CT6, and the following condition is satisfied: CT5/CT6=0.43.

In the image capturing optical system according to the 1st embodiment, when a focal length of the image capturing optical system is f, an axial distance between the fifth lens element 150 and the sixth lens element 160 is T56, and the following condition is satisfied: f/T56=13.28.

In the image capturing optical system according to the 1st embodiment, when a sum of the central thicknesses of the first lens element 110, the second lens element 120, the third lens element 130, the fourth lens element 140, the fifth lens element 150, and the sixth lens element 160 is ΣCT, an axial distance between the object-side surface 111 of the first lens element 110 and the image-side surface 162 of the sixth lens element 160 is Td, and the following condition is satisfied: ΣCT/Td=0.69.

In the image capturing optical system according to the 1st embodiment, when an axial distance from the stop 110 to the image-side surface 162 of the sixth lens element 160 is Sd, an axial distance between the object-side surface 111 of the first lens element 110 and the image-side surface 162 of the sixth lens element 160 is Td, and the following condition is satisfied: Sd/Td=0.92.

In the image capturing optical system according to the 1st embodiment, when an axial distance between the object-side surface 111 of the first lens element 110 and the image-side surface 162 of the sixth lens element 160 is Td, a half of the maximal field of view of the image capturing optical system is HFOV, and the following condition is satisfied: Td/Tan (HFOV)=5.92 (mm).

In the image capturing optical system according to the 1st embodiment, when a vertical distance between an optical axis and a critical point being the closest to the image surface 180 and on the off-axis region of the image-side surface 152 of the fifth lens element 150 is Yc52, the value is: Yc52=1.24 (mm).

In the image capturing optical system according to the 1st embodiment, when a vertical distance between an optical axis and a critical point being the closest to the image surface 180 and on the off-axis region of the image-side surface 162 of the sixth lens element 160 is Yc62, the value is: Yc62=1.31 (mm).

In the image capturing optical system according to the 1st embodiment, when a curvature radius of the object-side surface 161 of the sixth lens element 160 is R11, a curvature radius of the image-side surface 162 of the sixth lens element 160 is R12, and the following condition is satisfied: (R11+R12)/(R11−R12)=3.77.

The detailed optical data of the 1st embodiment are shown in Table 1 and the aspheric surface data are shown in Table 2 below.

TABLE 1

(Embodiment 1)
f = 4.98 mm, Fno = 2.35, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.375 | | | | |
| 2 | Lens 1 | 1.696 | ASP | 0.631 | Plastic | 1.544 | 55.9 | 3.48 |
| 3 | | 14.050 | ASP | 0.037 | | | | |
| 4 | Lens 2 | 5.844 | ASP | 0.250 | Plastic | 1.640 | 23.3 | −6.35 |
| 5 | | 2.356 | ASP | 0.294 | | | | |
| 6 | Lens 3 | 8.136 | ASP | 0.573 | Plastic | 1.583 | 30.2 | 15.13 |
| 7 | | 101.291 | ASP | 0.524 | | | | |
| 8 | Lens 4 | 98.799 | ASP | 0.429 | Plastic | 1.640 | 23.3 | −17.75 |
| 9 | | 10.168 | ASP | 0.176 | | | | |
| 10 | Lens 5 | 4.702 | ASP | 0.397 | Plastic | 1.583 | 30.2 | 63.16 |
| 11 | | 5.222 | ASP | 0.375 | | | | |
| 12 | Lens 6 | 3.618 | ASP | 0.921 | Plastic | 1.530 | 55.8 | −11.99 |
| 13 | | 2.102 | ASP | 0.400 | | | | |
| 14 | IR-filter | Plano | | 0.210 | Glass | 1.517 | 64.2 | — |
| 15 | | Plano | | 0.386 | | | | |
| 16 | Image | Plano | | — | | | | |

Note:
Reference wavelength is 587.6 nm (d-line).

TABLE 2

Aspheric Coefficients

| | Surface # | | | | |
|---|---|---|---|---|---|
| 2 | 3 | 4 | 5 | 6 | 7 |
| k = 5.1033E−01 | −2.6997E+01 | −1.5685E+01 | −1.7971E+01 | −1.1624E+01 | 5.0000E+00 |
| A4 = −1.0237E−02 | −1.3578E−01 | −2.0471E−01 | 5.8794E−02 | −4.3219E−02 | −2.4944E−02 |
| A6 = 8.0727E−03 | 4.2359E−01 | 5.5254E−01 | 3.0816E−02 | 6.1849E−02 | −1.8604E−02 |
| A8 = −6.3498E−02 | −6.9773E−01 | −8.7160E−01 | −6.2316E−02 | −1.8346E−01 | 7.6533E−02 |
| A10 = 1.5468E−01 | 7.0096E−01 | 8.9773E−01 | 1.1384E−01 | 3.3296E−01 | −1.7328E−01 |
| A12 = −2.1392E−01 | −3.8990E−01 | −5.3162E−01 | −9.0637E−02 | −3.4034E−01 | 1.9936E−01 |

TABLE 2-continued

Aspheric Coefficients

| | | | | | | |
|---|---|---|---|---|---|---|
| A14 = | 1.5039E−01 | 8.0313E−02 | 1.2824E−01 | 3.3351E−02 | 1.8694E−01 | −1.1432E−01 |
| A16 = | −4.3678E−02 | 1.7898E−03 | 6.8476E−14 | 1.2190E−13 | −3.9034E−02 | 2.7103E−02 |

| | Surface # | | | | | |
|---|---|---|---|---|---|---|
| | 8 | 9 | 10 | 11 | 12 | 13 |
| k = | 1.0000E+00 | −1.0000E+01 | −2.6156E+01 | −9.0000E+01 | −1.5765E+00 | −3.0943E+00 |
| A4 = | −5.8233E−02 | −1.1341E−02 | 1.2883E−01 | 1.1124E−01 | −1.3569E−01 | −9.5382E−02 |
| A6 = | 1.3092E−02 | −4.6913E−02 | −1.7239E−01 | −1.2838E−01 | 2.1072E−02 | 2.5646E−02 |
| A8 = | 9.4298E−03 | 3.5622E−02 | 9.1360E−02 | 6.1432E−02 | 4.0162E−03 | −4.8418E−03 |
| A10 = | −4.5268E−02 | −1.4439E−02 | −2.9484E−02 | −1.8052E−02 | −1.7726E−03 | 6.0677E−04 |
| A12 = | 3.2791E−02 | 3.2161E−03 | 5.0986E−03 | 3.2301E−03 | 2.4817E−04 | −5.0451E−05 |
| A14 = | −8.8998E−03 | −2.8437E−04 | −3.0200E−04 | −3.1703E−04 | −1.6081E−05 | 2.7030E−06 |
| A16 = | 1.1581E−05 | −3.8462E−06 | −1.0271E−05 | 1.2958E−05 | 4.0520E−07 | −7.0491E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
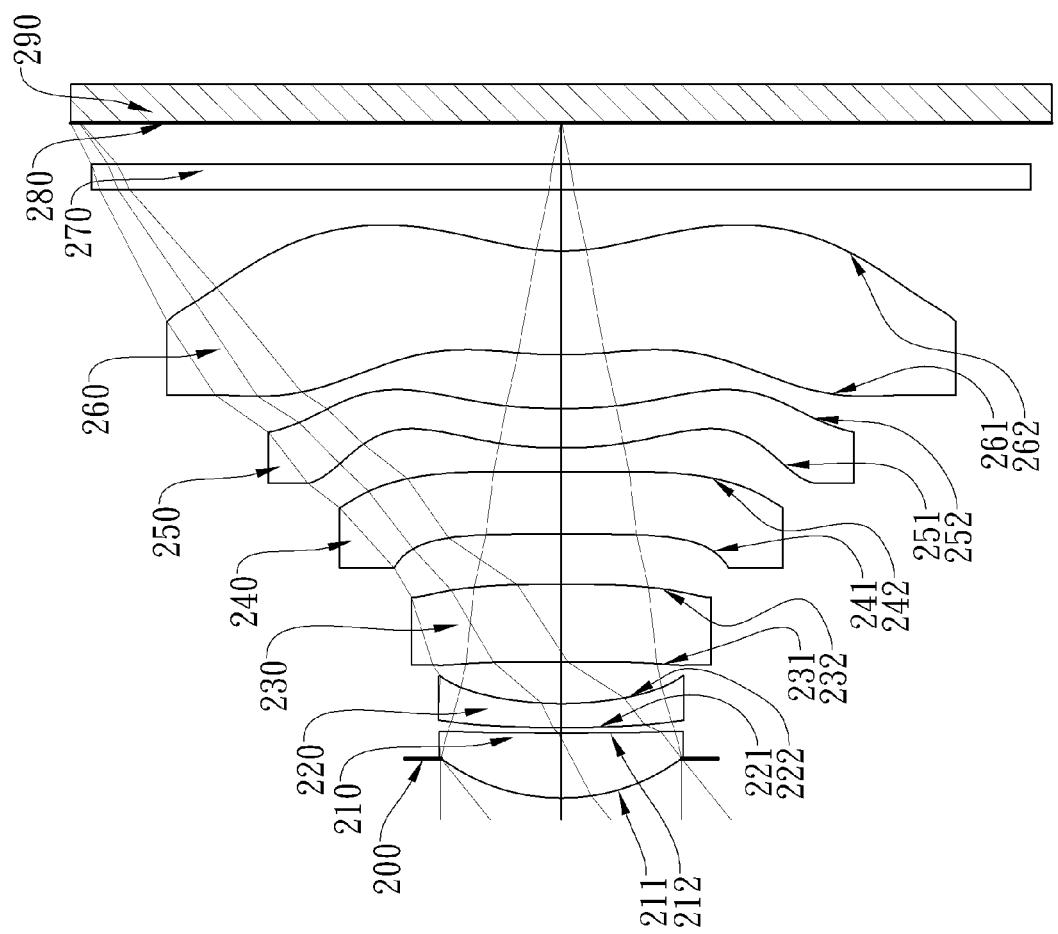
FIG. 2A is a schematic view of an image capturing device according to the 2nd embodiment of the present disclosure.
Figure 2B:
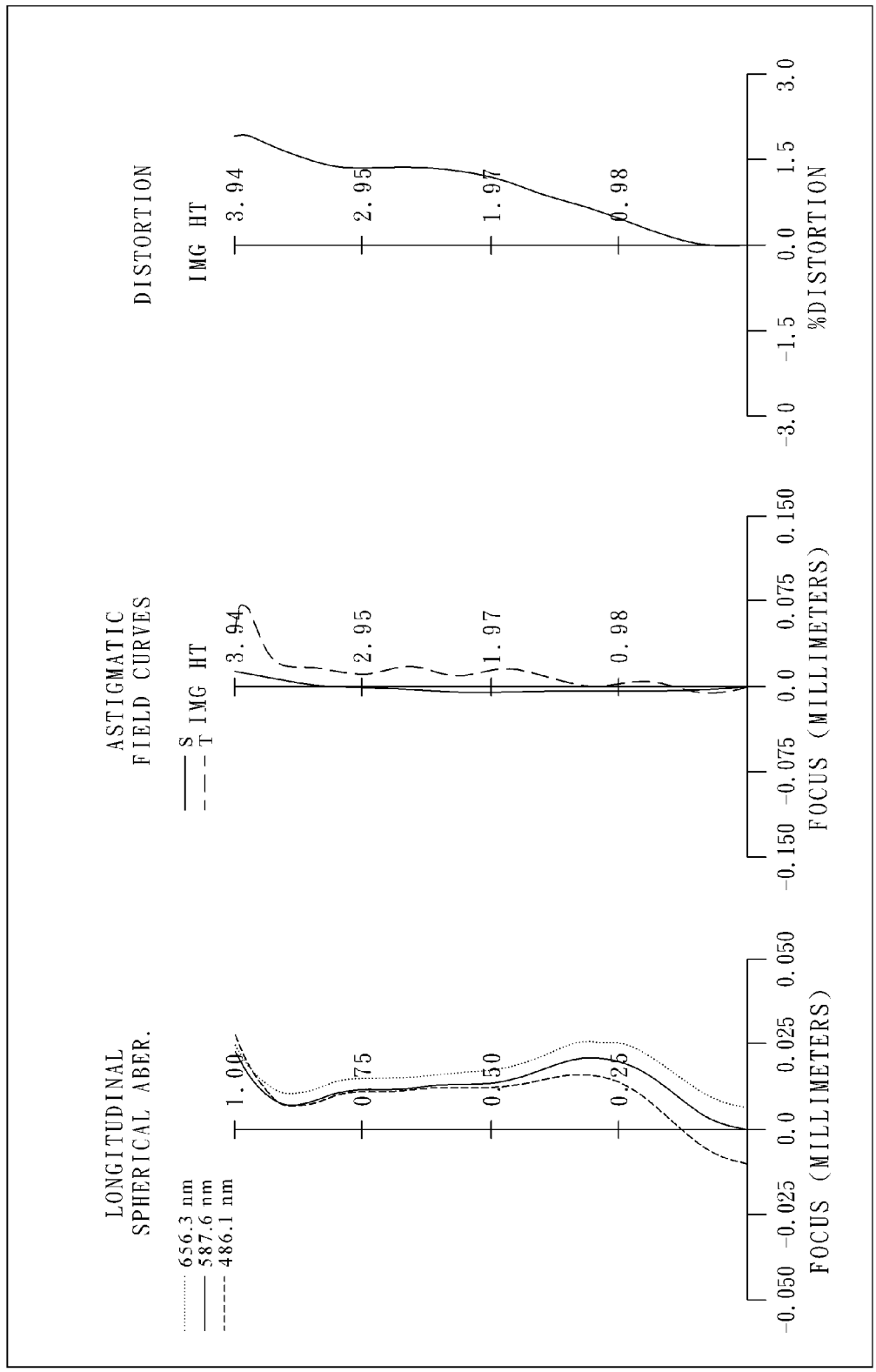
FIG. 2B shows spherical aberration curves, astigmatic field curves and a distortion curve of the image capturing device according to the 2nd embodiment.

FIG. 2A is a schematic view of an image capturing device according to the 2nd embodiment of the present disclosure. FIG. 2B shows, in order from left to right, spherical aberration curves, astigmatic field curves and a distortion curve of the image capturing device according to the 2nd embodiment.

In FIG. 2A, the image capturing device includes the image capturing optical system (not otherwise herein labeled) of the present disclosure and an image sensor 290. The image capturing optical system includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the image capturing optical system has a total of six lens elements (210-260) with refractive power.

The first lens element 210 with positive refractive power has a convex object-side surface 211 in a paraxial region thereof and a concave image-side surface 212 in a paraxial region thereof, which are both aspheric, and the first lens element 210 is made of plastic material.

The second lens element 220 with negative refractive power has a convex object-side surface 221 in a paraxial region thereof and a concave image-side surface 222 in a paraxial region thereof, which are both aspheric, and the second lens element 220 is made of plastic material.

The third lens element 230 with positive refractive power has a convex object-side surface 231 in a paraxial region thereof and a convex image-side surface 232 in a paraxial region thereof, which are both aspheric, and the third lens element 230 is made of plastic material.

The fourth lens element 240 with negative refractive power has a flat object-side surface 241 in a paraxial region thereof and a concave image-side surface 242 in a paraxial region thereof, which are both aspheric, and the fourth lens element 240 is made of plastic material.

The fifth lens element 250 with positive refractive power has a convex object-side surface 251 in a paraxial region thereof and a concave image-side surface 252 in a paraxial region thereof, which are both aspheric, and the fifth lens element 250 is made of plastic material. Furthermore, the image-side surface 252 of the fifth lens element 250 has at least one convex shape in an off-axis region thereof.

The sixth lens element 260 with negative refractive power has a convex object-side surface 261 in a paraxial region thereof and a concave image-side surface 262 in a paraxial region thereof, which are both aspheric, and the sixth lens element 260 is made of plastic material. Furthermore, the image-side surface 262 of the sixth lens element 260 has at least one convex shape in an off-axis region thereof.

The IR-cut filter 270 is made of glass and located between the sixth lens element 260 and the image surface 280, and will not affect the focal length of the image capturing optical system. The image sensor 290 is disposed on the image surface 280 of the image capturing optical system.

The detailed optical data of the 2nd embodiment are shown in Table 3 and the aspheric surface data are shown in Table 4 below.

TABLE 3

(Embodiment 2)
f = 4.76 mm, Fno = 2.42, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.322 | | | | |
| 2 | Lens 1 | 1.673 | ASP | 0.530 | Plastic | 1.544 | 55.9 | 3.36 |
| 3 | | 17.663 | ASP | 0.043 | | | | |
| 4 | Lens 2 | 6.139 | ASP | 0.198 | Plastic | 1.639 | 23.5 | −7.09 |

TABLE 3-continued (Embodiment 2)
f = 4.76 mm, Fno = 2.42, HFOV = 39.0 deg.

| Surface # | | Curvature Radius | | Thickness | Material | Index | Abbe # | Focal Length |
|---|---|---|---|---|---|---|---|---|
| 5 | | 2.575 | ASP | 0.341 | | | | |
| 6 | Lens 3 | 120.746 | ASP | 0.636 | Plastic | 1.544 | 55.9 | 31.71 |
| 7 | | −20.094 | ASP | 0.410 | | | | |
| 8 | Lens 4 | ∞ | ASP | 0.508 | Plastic | 1.639 | 23.5 | −68.90 |
| 9 | | 44.027 | ASP | 0.198 | | | | |
| 10 | Lens 5 | 3.912 | ASP | 0.320 | Plastic | 1.544 | 55.9 | 49.51 |
| 11 | | 4.445 | ASP | 0.441 | | | | |
| 12 | Lens 6 | 3.155 | ASP | 0.849 | Plastic | 1.535 | 55.7 | −8.98 |
| 13 | | 1.725 | ASP | 0.500 | | | | |
| 14 | IR-filter | Plano | | 0.210 | Glass | 1.517 | 64.2 | — |
| 15 | | Plano | | 0.335 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 4.9970E−01 | −4.1136E+01 | −8.4623E+00 | −1.6832E+01 | −3.0967E+01 | 5.0000E+00 |
| A4 = | −1.7841E−02 | −1.0373E−01 | −1.7629E−01 | 3.3327E−02 | −5.3358E−02 | −4.6760E−02 |
| A6 = | 8.2716E−02 | 2.7620E−01 | 4.1988E−01 | 6.6860E−02 | 4.6274E−02 | 2.6500E−02 |
| A8 = | −3.7290E−01 | −2.5453E−01 | −3.2418E−01 | 7.9112E−02 | −1.8924E−01 | −5.4834E−02 |
| A10 = | 8.6497E−01 | −1.1512E−01 | −3.3651E−01 | −4.0125E−01 | 4.6722E−01 | 4.0730E−02 |
| A12 = | −1.1321E+00 | 4.7571E−01 | 1.0234E+00 | 6.5046E−01 | −6.3843E−01 | 3.7354E−04 |
| A14 = | 7.7682E−01 | −3.9748E−01 | −8.8408E−01 | −4.4405E−01 | 4.6590E−01 | −1.5313E−02 |
| A16 = | −2.2099E−01 | 1.0377E−01 | 2.6366E−01 | 1.1374E−01 | −1.2913E−01 | 6.8055E−03 |

| Surface # | 8 | 9 | 10 | 11 | 12 | 13 |
|---|---|---|---|---|---|---|
| k = | 0.0000E+00 | −9.9999E+00 | −2.8927E+01 | −8.6029E+01 | −1.4835E+00 | −4.6685E+00 |
| A4 = | −5.1927E−02 | −6.9381E−05 | 1.6612E−01 | 1.5015E−01 | −1.7369E−01 | −8.5113E−02 |
| A6 = | 5.7907E−02 | −7.1957E−02 | −2.1383E−01 | −1.5579E−01 | 5.6578E−02 | 3.0048E−02 |
| A8 = | −1.1240E−01 | 8.4056E−02 | 1.2611E−01 | 7.6436E−02 | −1.1491E−02 | −8.0922E−03 |
| A10 = | 1.1977E−01 | −5.6594E−02 | −4.8334E−02 | −2.4365E−02 | 1.8657E−03 | 1.4444E−03 |
| A12 = | −8.7292E−02 | 2.2170E−02 | 1.0573E−02 | 4.7816E−03 | −2.2705E−04 | −1.5946E−04 |
| A14 = | 3.6112E−02 | −4.6778E−03 | −1.1223E−03 | −5.0537E−04 | 1.6660E−05 | 9.7918E−06 |
| A16 = | −6.6351E−03 | 4.0809E−04 | 4.2552E−05 | 2.1796E−05 | −5.2659E−07 | −2.5276E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.76 | ΣCT/Td | 0.68 |
| Fno | 2.42 | Sd/Td | 0.93 |
| HFOV [deg.] | 39.0 | Td/Tan(HFOV) [mm] | 5.52 |
| V5 | 55.9 | Yc52 [mm] | 1.35 |
| T34/CT5 | 1.28 | Yc62 [mm] | 1.45 |
| CT5/CT6 | 0.38 | (R11 + R12)/(R11 − R12) | 3.41 |
| f/T56 | 10.79 | | |

3rd Embodiment

Figure 3A:
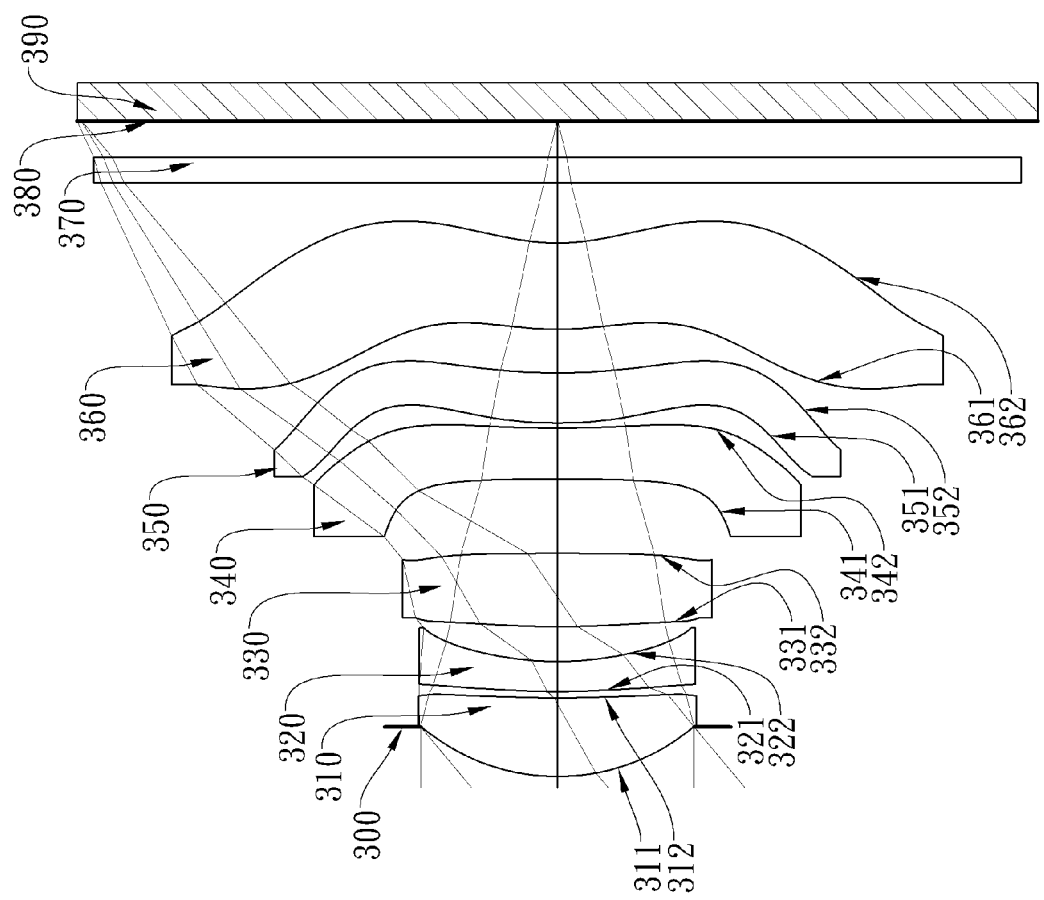
FIG. 3A is a schematic view of an image capturing device according to the 3rd embodiment of the present disclosure.
Figure 3B:
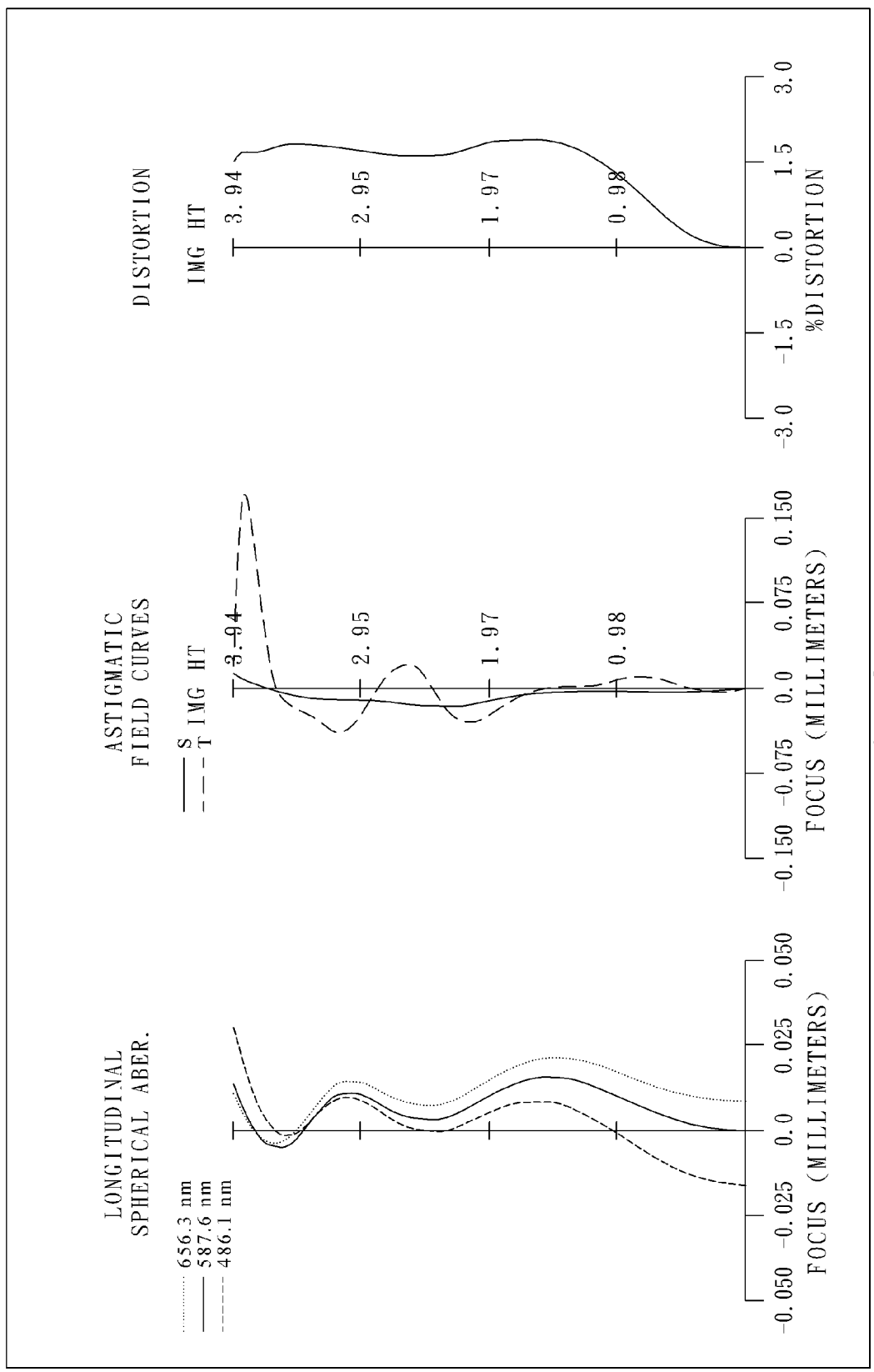
FIG. 3B shows spherical aberration curves, astigmatic field curves and a distortion curve of the image capturing device according to the 3rd embodiment.

FIG. 3A is a schematic view of an image capturing device according to the 3rd embodiment of the present disclosure. FIG. 3B shows, in order from left to right, spherical aberration curves, astigmatic field curves and a distortion curve of the image capturing device according to the 3rd embodiment.

In FIG. 3A, the image capturing device includes the image capturing optical system (not otherwise herein labeled) of the present disclosure and an image sensor 390. The image capturing optical system includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the image capturing optical system has a total of six lens elements (310-360) with refractive power.

The first lens element 310 with positive refractive power has a convex object-side surface 311 in a paraxial region thereof and a concave image-side surface 312 in a paraxial region thereof, which are both aspheric, and the first lens element 310 is made of plastic material.

The second lens element 320 with negative refractive power has a convex object-side surface 321 in a paraxial region thereof and a concave image-side surface 322 in a paraxial region thereof, which are both aspheric, and the second lens element 320 is made of plastic material.

The third lens element 330 with positive refractive power has a convex object-side surface 331 in a paraxial region thereof and a convex image-side surface 332 in a paraxial region thereof, which are both aspheric, and the third lens element 330 is made of plastic material.

The fourth lens element 340 with negative refractive power has a concave object-side surface 341 in a paraxial region thereof and a concave image-side surface 342 in a paraxial region thereof, which are both aspheric, and the fourth lens element 340 is made of plastic material.

The fifth lens element 350 with positive refractive power has a convex object-side surface 351 in a paraxial region thereof and a concave image-side surface 352 in a paraxial region thereof, which are both aspheric, and the fifth lens element 350 is made of plastic material. Furthermore, the image-side surface 352 of the fifth lens element 350 has at least one convex shape in an off-axis region thereof.

The sixth lens element 360 with negative refractive power has a convex object-side surface 361 in a paraxial region thereof and a concave image-side surface 362 in a paraxial region thereof, which are both aspheric, and the sixth lens element 360 is made of plastic material. Furthermore, the image-side surface 362 of the sixth lens element 360 has at least one convex shape in an off-axis region thereof.

The IR-cut filter 370 is made of glass and located between the sixth lens element 360 and the image surface 380, and will not affect the focal length of the image capturing optical system. The image sensor 390 is disposed on the image surface 380 of the image capturing optical system.

The detailed optical data of the 3rd embodiment are shown in Table 5 and the aspheric surface data are shown in Table 6 below.

TABLE 5

(Embodiment 3)
f = 4.63 mm, Fno = 2.05, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.409 | | | | |
| 2 | Lens 1 | 1.749 | ASP | 0.650 | Plastic | 1.544 | 55.9 | 3.98 |
| 3 | | 7.891 | ASP | 0.051 | | | | |
| 4 | Lens 2 | 4.545 | ASP | 0.250 | Plastic | 1.639 | 23.5 | −8.28 |
| 5 | | 2.393 | ASP | 0.288 | | | | |
| 6 | Lens 3 | 6.844 | ASP | 0.606 | Plastic | 1.544 | 55.9 | 11.94 |
| 7 | | −123.739 | ASP | 0.616 | | | | |
| 8 | Lens 4 | −30.610 | ASP | 0.421 | Plastic | 1.639 | 23.5 | −11.61 |
| 9 | | 9.845 | ASP | 0.042 | | | | |
| 10 | Lens 5 | 3.632 | ASP | 0.415 | Plastic | 1.639 | 23.5 | 19.08 |
| 11 | | 4.942 | ASP | 0.361 | | | | |
| 12 | Lens 6 | 2.587 | ASP | 0.713 | Plastic | 1.544 | 55.9 | −13.99 |
| 13 | | 1.743 | ASP | 0.500 | | | | |
| 14 | IR-filter | Plano | | 0.210 | Glass | 1.517 | 64.2 | — |
| 15 | | Plano | | 0.298 | | | | |
| 16 | Image | Plano | | — | | | | |

Note:
Reference wavelength is 587.6 nm (d-line).

TABLE 6

Aspheric Coefficients

| Surface # | | | | | |
|---|---|---|---|---|---|
| 2 | 3 | 4 | 5 | 6 | 7 |
| k = | 4.2156E−01 | −6.8627E+01 | −2.7372E+01 | −1.9139E+01 | −1.0000E+00 | 5.0000E+00 |
| A4 = | −5.8099E−03 | −1.4091E−01 | −2.0931E−01 | 5.1235E−02 | −4.4338E−02 | −2.0157E−02 |
| A6 = | −2.6125E−02 | 3.9669E−01 | 5.4828E−01 | 2.5873E−02 | 6.0516E−02 | −2.7084E−02 |
| A8 = | 8.1476E−02 | −6.3693E−01 | −8.7675E−01 | −6.2311E−02 | −1.8137E−01 | 9.4531E−02 |
| A10 = | −1.3590E−01 | 6.3512E−01 | 9.0644E−01 | 1.0984E−01 | 3.2491E−01 | −2.0009E−01 |
| A12 = | 1.0381E−01 | −3.5624E−01 | −5.3120E−01 | −9.0529E−02 | −3.3860E−01 | 2.1056E−01 |
| A14 = | −3.1430E−02 | 7.9618E−02 | 1.2834E−01 | 3.3449E−02 | 1.8701E−01 | −1.1000E−01 |
| A16 = | | | | | −3.9018E−02 | 2.3616E−02 |

| Surface # | | | | | |
|---|---|---|---|---|---|
| 8 | 9 | 10 | 11 | 12 | 13 |
| k = | −1.0000E+01 | −7.8321E+00 | −2.2872E+01 | −9.0000E+01 | −1.7951E+00 | −2.6545E+00 |
| A4 = | −3.9709E−02 | 6.7092E−03 | 1.2998E−01 | 7.8341E−02 | −1.9285E−01 | −1.2852E−01 |
| A6 = | 3.3025E−02 | −5.3314E−02 | −1.7183E−01 | −8.3004E−02 | 4.7426E−02 | 4.4352E−02 |
| A8 = | −1.2893E−02 | 3.4781E−02 | 9.4694E−02 | 3.2544E−02 | −4.3032E−03 | −1.1993E−02 |
| A10 = | −3.9145E−02 | −1.4608E−02 | −3.2299E−02 | −7.7587E−03 | −6.0407E−06 | 2.1964E−03 |

TABLE 6-continued

| Aspheric Coefficients | | | | | | |
|---|---|---|---|---|---|---|
| A12 = | 3.3207E−02 | 3.2142E−03 | 5.7448E−03 | 9.8926E−04 | 2.3004E−05 | −2.4505E−04 |
| A14 = | −9.0943E−03 | −2.7166E−04 | −3.9277E−04 | −4.9367E−05 | −7.2853E−07 | 1.4931E−05 |
| A16 = | | | | | −2.2981E−08 | −3.7843E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.63 | ΣCT/Td | 0.69 |
| Fno | 2.05 | Sd/Td | 0.91 |
| HFOV [deg.] | 39.9 | Td/Tan(HFOV) [mm] | 5.28 |
| V5 | 23.5 | Yc52 [mm] | 1.22 |
| T34/CT5 | 1.48 | Yc62 [mm] | 1.27 |
| CT5/CT6 | 0.58 | (R11 + R12)/(R11 − R12) | 5.13 |
| f/T56 | 12.83 | | |

4th Embodiment

Figure 4A:
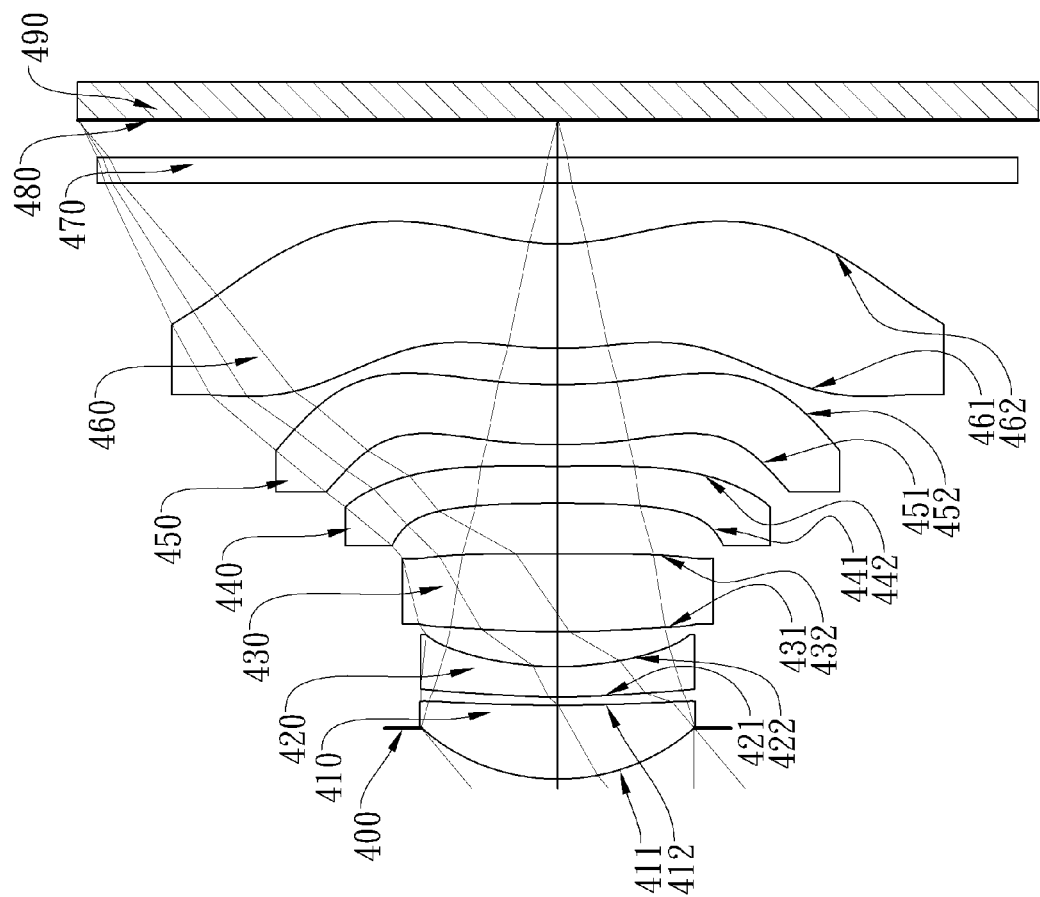
FIG. 4A is a schematic view of an image capturing device according to the 4th embodiment of the present disclosure.
Figure 4B:
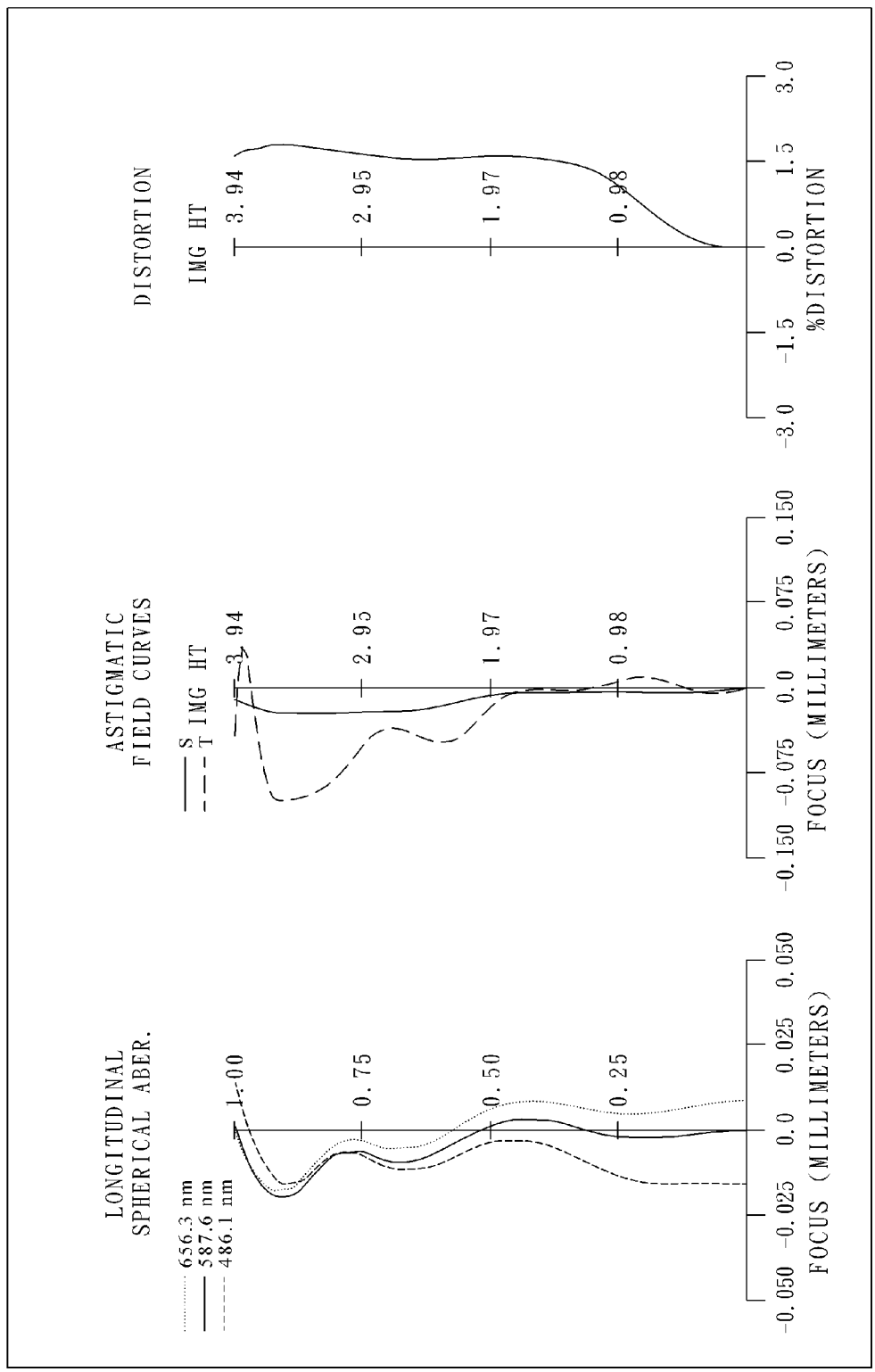
FIG. 4B shows spherical aberration curves, astigmatic field curves and a distortion curve of the image capturing device according to the 4th embodiment.

FIG. 4A is a schematic view of an image capturing device according to the 4th embodiment of the present disclosure. FIG. 4B shows, in order from left to right, spherical aberration curves, astigmatic field curves and a distortion curve of the image capturing device according to the 4th embodiment.

In FIG. 4A, the image capturing device includes the image capturing optical system (not otherwise herein labeled) of the present disclosure and an image sensor 490. The image capturing optical system includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the image capturing optical system has a total of six lens elements (410-460) with refractive power.

The first lens element 410 with positive refractive power has a convex object-side surface 411 in a paraxial region thereof and a concave image-side surface 412 in a paraxial region thereof, which are both aspheric, and the first lens element 410 is made of plastic material.

The second lens element 420 with negative refractive power has a convex object-side surface 421 in a paraxial region thereof and a concave image-side surface 422 in a paraxial region thereof, which are both aspheric, and the second lens element 420 is made of plastic material.

The third lens element 430 with positive refractive power has a convex object-side surface 431 in a paraxial region thereof and a convex image-side surface 432 in a paraxial region thereof, which are both aspheric, and the third lens element 430 is made of plastic material.

The fourth lens element 440 with negative refractive power has a concave object-side surface 441 in a paraxial region thereof and a concave image-side surface 442 in a paraxial region thereof, which are both aspheric, and the fourth lens element 440 is made of plastic material.

The fifth lens element 450 with positive refractive power has a convex object-side surface 451 in a paraxial region thereof and a concave image-side surface 452 in a paraxial region thereof, which are both aspheric, and the fifth lens element 450 is made of plastic material. Furthermore, the image-side surface 452 of the fifth lens element 450 has at least one convex shape in an off-axis region thereof.

The sixth lens element 460 with negative refractive power has a convex object-side surface 461 in a paraxial region thereof and a concave image-side surface 462 in a paraxial region thereof, which are both aspheric, and the sixth lens element 460 is made of plastic material. Furthermore, the image-side surface 462 of the sixth lens element 460 has at least one convex shape in an off-axis region thereof.

The IR-cut filter 470 is made of glass and located between the sixth lens element 460 and the image surface 480, and will not affect the focal length of the image capturing optical system. The image sensor 490 is disposed on the image surface 480 of the image capturing optical system.

The detailed optical data of the 4th embodiment are shown in Table 7 and the aspheric surface data are shown in Table 8 below.

TABLE 7

(Embodiment 4)
f = 4.61 mm, Fno = 2.06, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.419 | | | | |
| 2 | Lens 1 | 1.727 | ASP | 0.606 | Plastic | 1.544 | 55.9 | 3.91 |
| 3 | | 8.032 | ASP | 0.068 | | | | |
| 4 | Lens 2 | 4.337 | ASP | 0.250 | Plastic | 1.639 | 23.5 | −8.42 |
| 5 | | 2.348 | ASP | 0.287 | | | | |
| 6 | Lens 3 | 7.671 | ASP | 0.642 | Plastic | 1.544 | 55.9 | 13.74 |
| 7 | | −289.604 | ASP | 0.416 | | | | |
| 8 | Lens 4 | −18.804 | ASP | 0.304 | Plastic | 1.639 | 23.5 | −20.10 |
| 9 | | 40.780 | ASP | 0.178 | | | | |
| 10 | Lens 5 | 4.453 | ASP | 0.494 | Plastic | 1.639 | 23.5 | 116.13 |

TABLE 7-continued (Embodiment 4)
f = 4.61 mm, Fno = 2.06, HFOV = 40.0 deg.

| Surface # | | Curvature Radius | | Thickness | Material | Index | Abbe # | Focal Length |
|---|---|---|---|---|---|---|---|---|
| 11 | | 4.533 | ASP | 0.297 | | | | |
| 12 | Lens 6 | 2.684 | ASP | 0.862 | Plastic | 1.544 | 55.9 | −18.12 |
| 13 | | 1.871 | ASP | 0.500 | | | | |
| 14 | IR-filter | Plano | | 0.210 | Glass | 1.517 | 64.2 | — |
| 15 | | Plano | | 0.307 | | | | |
| 16 | Image | Plano | | — | | | | |

Note:
Reference wavelength is 587.6 nm (d-line).

TABLE 8

Aspheric Coefficients

| | | | Surface # | | | |
|---|---|---|---|---|---|---|
| | 2 | 3 | 4 | 5 | 6 | 7 |
| k = | 6.2785E−01 | −3.5650E+01 | −2.9107E+01 | −1.9144E+01 | −1.0000E+00 | 5.0000E+00 |
| A4 = | −1.1984E−02 | −1.4252E−01 | −2.0799E−01 | 3.2173E−02 | −3.9572E−02 | −1.3291E−02 |
| A6 = | −2.4903E−02 | 3.9021E−01 | 5.4580E−01 | 1.3613E−01 | 9.8033E−02 | −2.0812E−02 |
| A8 = | 7.8701E−02 | −6.3760E−01 | −8.8843E−01 | −3.5657E−01 | −3.1038E−01 | 9.0178E−02 |
| A10 = | −1.3609E−01 | 6.4310E−01 | 9.1802E−01 | 5.1834E−01 | 5.6657E−01 | −2.0033E−01 |
| A12 = | 1.0381E−01 | −3.5624E−01 | −5.3120E−01 | −3.7722E−01 | −5.8499E−01 | 2.1056E−01 |
| A14 = | −3.1430E−02 | 7.9618E−02 | 1.2834E−01 | 1.1452E−01 | 3.1634E−01 | −1.1000E−01 |
| A16 = | | | | | −6.7081E−02 | 2.3616E−02 |

| | | | Surface # | | | |
|---|---|---|---|---|---|---|
| | 8 | 9 | 10 | 11 | 12 | 13 |
| k = | 1.0000E+00 | −7.8321E+00 | −6.0163E+01 | −9.0000E+01 | −1.4920E+00 | −2.8741E+00 |
| A4 = | −5.5852E−02 | −3.7519E−02 | 1.1598E−01 | 7.0629E−02 | −1.9411E−01 | −1.0861E−01 |
| A6 = | 3.3811E−02 | −3.3422E−02 | −1.6994E−01 | −7.9439E−02 | 6.2555E−02 | 3.6384E−02 |
| A8 = | 5.0639E−04 | 4.6450E−02 | 9.5228E−02 | 3.2511E−02 | −1.2703E−02 | −9.6330E−03 |
| A10 = | −4.5273E−02 | −2.7762E−02 | −3.2367E−02 | −7.7746E−03 | 2.0563E−03 | 1.7331E−03 |
| A12 = | 3.3213E−02 | 8.0206E−03 | 5.7516E−03 | 9.8805E−04 | −2.4608E−04 | −1.9112E−04 |
| A14 = | −9.0900E−03 | −9.0640E−04 | −3.9307E−04 | −5.0408E−05 | 1.7567E−05 | 1.1560E−05 |
| A16 = | | | | | −5.3628E−07 | −2.9157E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.61 | ΣCT/Td | 0.72 |
| Fno | 2.06 | Sd/Td | 0.90 |
| HFOV [deg.] | 40.0 | Td/Tan(HFOV) [mm] | 5.25 |
| V5 | 23.5 | Yc52 [mm] | 1.22 |
| T34/CT5 | 0.84 | Yc62 [mm] | 1.34 |
| CT5/CT6 | 0.57 | (R11 + R12)/(R11 − R12) | 5.60 |
| f/T56 | 15.52 | | |

5th Embodiment

Figure 5A:
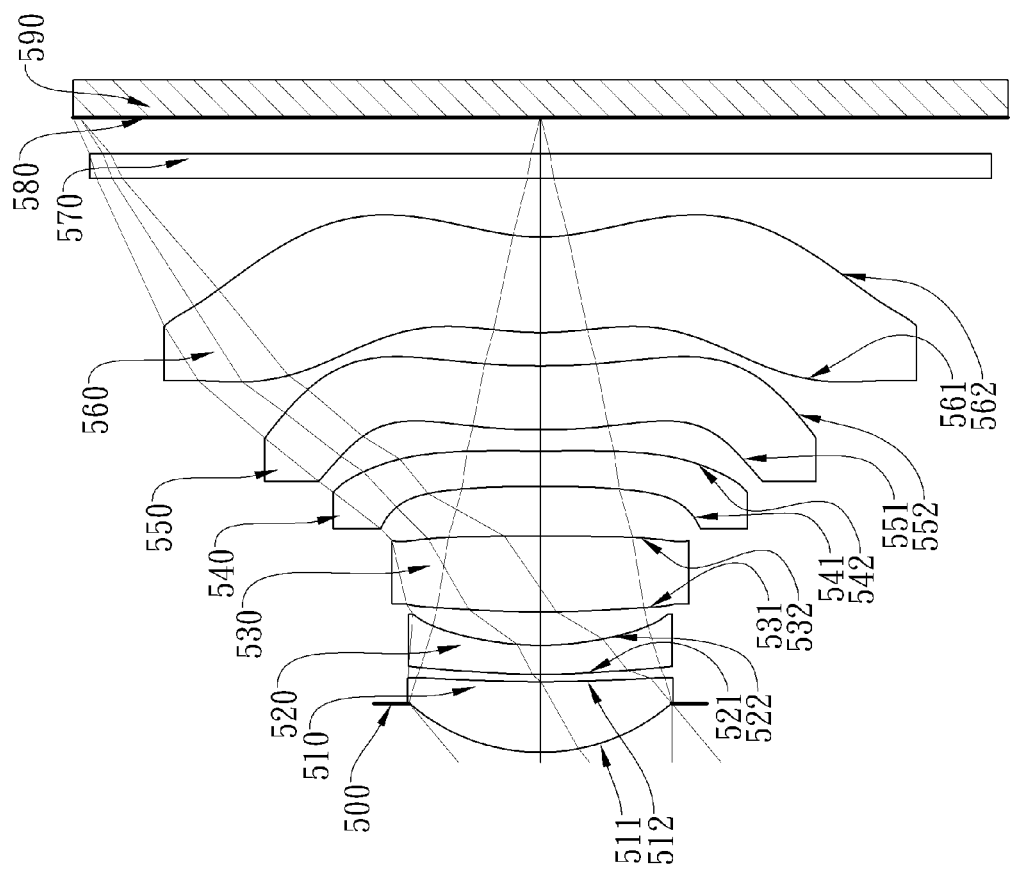
FIG. 5A is a schematic view of an image capturing device according to the 5th embodiment of the present disclosure.
Figure 5B:
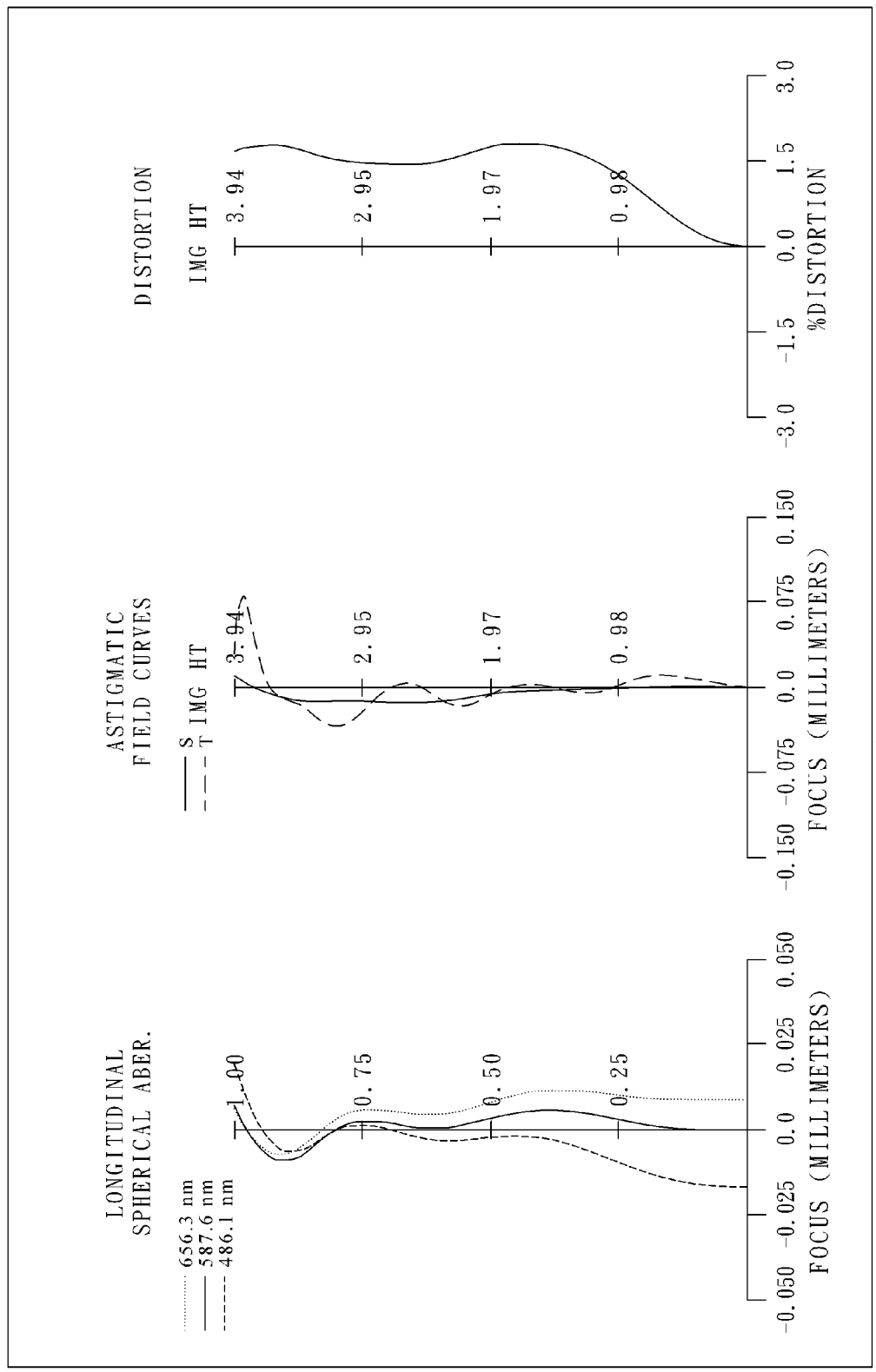
FIG. 5B shows spherical aberration curves, astigmatic field curves and a distortion curve of the image capturing device according to the 5th embodiment.

FIG. 5A is a schematic view of an image capturing device according to the 5th embodiment of the present disclosure. FIG. 5B shows, in order from left to right, spherical aberration curves, astigmatic field curves and a distortion curve of the image capturing device according to the 5th embodiment.

In FIG. 5A, the image capturing device includes the image capturing optical system (not otherwise herein labeled) of the present disclosure and an image sensor 590. The image capturing optical system includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein the image capturing optical system has a total of six lens elements (510-560) with refractive power.

The first lens element 510 with positive refractive power has a convex object-side surface 511 in a paraxial region thereof and a concave image-side surface 512 in a paraxial region thereof, which are both aspheric, and the first lens element 510 is made of plastic material.

The second lens element 520 with negative refractive power has a convex object-side surface 521 in a paraxial region thereof and a concave image-side surface 522 in a paraxial region thereof, which are both aspheric, and the second lens element 520 is made of plastic material.

The third lens element 530 with positive refractive power has a convex object-side surface 531 in a paraxial region thereof and a convex image-side surface 532 in a paraxial region thereof, which are both aspheric, and the third lens element 530 is made of plastic material.

The fourth lens element 540 with negative refractive power has a concave object-side surface 541 in a paraxial region thereof and a concave image-side surface 542 in a paraxial region thereof, which are both aspheric, and the fourth lens element 540 is made of plastic material.

The fifth lens element 550 with positive refractive power has a convex object-side surface 551 in a paraxial region thereof and a concave image-side surface 552 in a paraxial region thereof, which are both aspheric, and the fifth lens element 550 is made of plastic material. Furthermore, the image-side surface 552 of the fifth lens element 550 has at least one convex shape in an off-axis region thereof.

The sixth lens element 560 with negative refractive power has a convex object-side surface 561 in a paraxial region thereof and a concave image-side surface 562 in a paraxial region thereof, which are both aspheric, and the sixth lens element 560 is made of plastic material. Furthermore, the image-side surface 562 of the sixth lens element 560 has at least one convex shape in an off-axis region thereof.

The IR-cut filter 570 is made of glass and located between the sixth lens element 560 and the image surface 580, and will not affect the focal length of the image capturing optical system. The image sensor 590 is disposed on the image surface 580 of the image capturing optical system.

The detailed optical data of the 5th embodiment are shown in Table 9 and the aspheric surface data are shown in Table 10 below.

TABLE 9

(Embodiment 5)
f = 4.61 mm, Fno = 2.06, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.416 | | | | |
| 2 | Lens 1 | 1.730 | ASP | 0.601 | Plastic | 1.544 | 55.9 | 3.96 |
| 3 | | 7.667 | ASP | 0.062 | | | | |
| 4 | Lens 2 | 4.188 | ASP | 0.250 | Plastic | 1.639 | 23.5 | −8.81 |
| 5 | | 2.346 | ASP | 0.285 | | | | |
| 6 | Lens 3 | 7.492 | ASP | 0.647 | Plastic | 1.544 | 55.9 | 13.26 |
| 7 | | −189.243 | ASP | 0.426 | | | | |
| 8 | Lens 4 | −19.526 | ASP | 0.304 | Plastic | 1.639 | 23.5 | −20.76 |
| 9 | | 41.619 | ASP | 0.181 | | | | |
| 10 | Lens 5 | 5.631 | ASP | 0.546 | Plastic | 1.639 | 23.5 | 85.10 |
| 11 | | 6.044 | ASP | 0.285 | | | | |
| 12 | Lens 6 | 2.680 | ASP | 0.818 | Plastic | 1.544 | 55.9 | −14.63 |
| 13 | | 1.789 | ASP | 0.500 | | | | |
| 14 | IR-filter | Plano | | 0.210 | Glass | 1.517 | 64.2 | — |
| 15 | | Plano | | 0.312 | | | | |
| 16 | Image | Plano | | — | | | | |

Note:
Reference wavelength is 587.6 nm (d-line).

TABLE 10

Aspheric Coefficients

| | Surface # | | | | | |
|---|---|---|---|---|---|---|
| | 2 | 3 | 4 | 5 | 6 | 7 |
| k = | 6.2599E−01 | −3.7106E+01 | −2.9156E+01 | −1.9144E+01 | −1.0000E+00 | 5.0000E+00 |
| A4 = | −1.0900E−02 | −1.1351E−01 | −1.6068E−01 | 6.9451E−02 | −2.8674E−02 | −2.1459E−02 |
| A6 = | −2.0836E−02 | 2.4102E−01 | 3.1515E−01 | −6.9465E−02 | 4.4531E−02 | 2.3335E−02 |
| A8 = | 5.7545E−02 | −3.1210E−01 | −3.8742E−01 | 1.5484E−01 | −1.7894E−01 | −1.1893E−02 |
| A10 = | −1.0391E−01 | 2.7433E−01 | 3.5022E−01 | −1.6026E−01 | 3.7934E−01 | −8.1070E−02 |
| A12 = | 8.2912E−02 | −1.4135E−01 | −1.9895E−01 | 8.4917E−02 | −4.4730E−01 | 1.3649E−01 |
| A14 = | −2.6496E−02 | 2.8470E−02 | 4.8655E−02 | −1.1622E−02 | 2.7316E−01 | −8.8641E−02 |
| A16 = | | | | | −6.3760E−02 | 2.2025E−02 |

| | Surface # | | | | | |
|---|---|---|---|---|---|---|
| | 8 | 9 | 10 | 11 | 12 | 13 |
| k = | −5.9534E+00 | −7.8321E+00 | −5.9144E+01 | −8.3644E+01 | −1.5175E+00 | −2.8741E+00 |
| A4 = | −7.5656E−02 | −4.5283E−02 | 1.0080E−01 | 4.9526E−02 | −1.9498E−01 | −1.1956E−01 |
| A6 = | 9.7229E−02 | −9.3254E−03 | −1.6142E−01 | −5.5982E−02 | 6.1356E−02 | 4.5005E−02 |
| A8 = | −9.5490E−02 | 1.0155E−02 | 1.0150E−01 | 2.1728E−02 | −1.1823E−02 | −1.3326E−02 |
| A10 = | 3.4427E−02 | −1.9816E−02 | −4.0367E−02 | −5.2047E−03 | 1.7931E−03 | 2.5463E−03 |
| A12 = | −1.5905E−03 | 6.7490E−03 | 8.3204E−03 | 6.7330E−04 | −2.0560E−04 | −2.8665E−04 |
| A14 = | −2.9925E−03 | −8.4487E−04 | −6.5668E−04 | −3.4878E−05 | 1.4429E−05 | 1.7327E−05 |
| A16 = | | | | | −4.3906E−07 | −4.3304E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.61 | ΣCT/Td | 0.72 |
| Fno | 2.06 | Sd/Td | 0.91 |
| HFOV [deg.] | 40.0 | Td/Tan(HFOV) [mm] | 5.25 |
| V5 | 23.5 | Yc52 [mm] | 1.22 |
| T34/CT5 | 0.78 | Yc62 [mm] | 1.32 |
| CT5/CT6 | 0.67 | (R11 + R12)/(R11 − R12) | 5.02 |
| f/T56 | 16.18 | | |

6th Embodiment

Figure 6A:
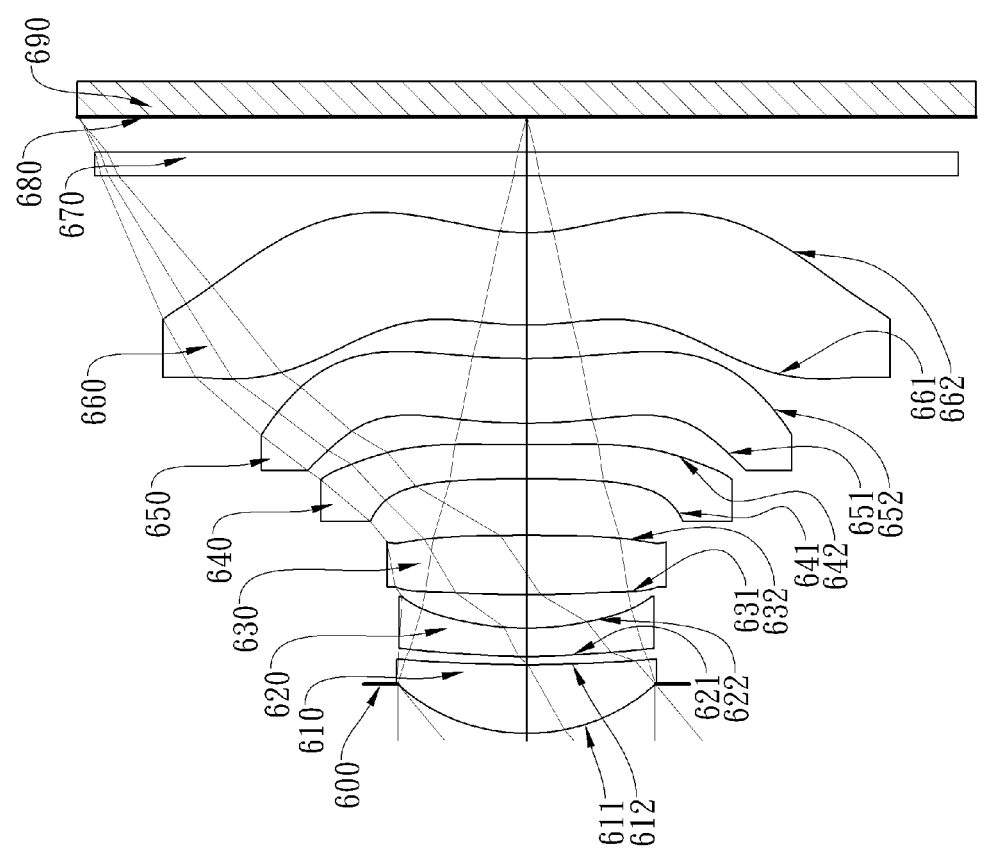
FIG. 6A is a schematic view of an image capturing device according to the 6th embodiment of the present disclosure.
Figure 6B:
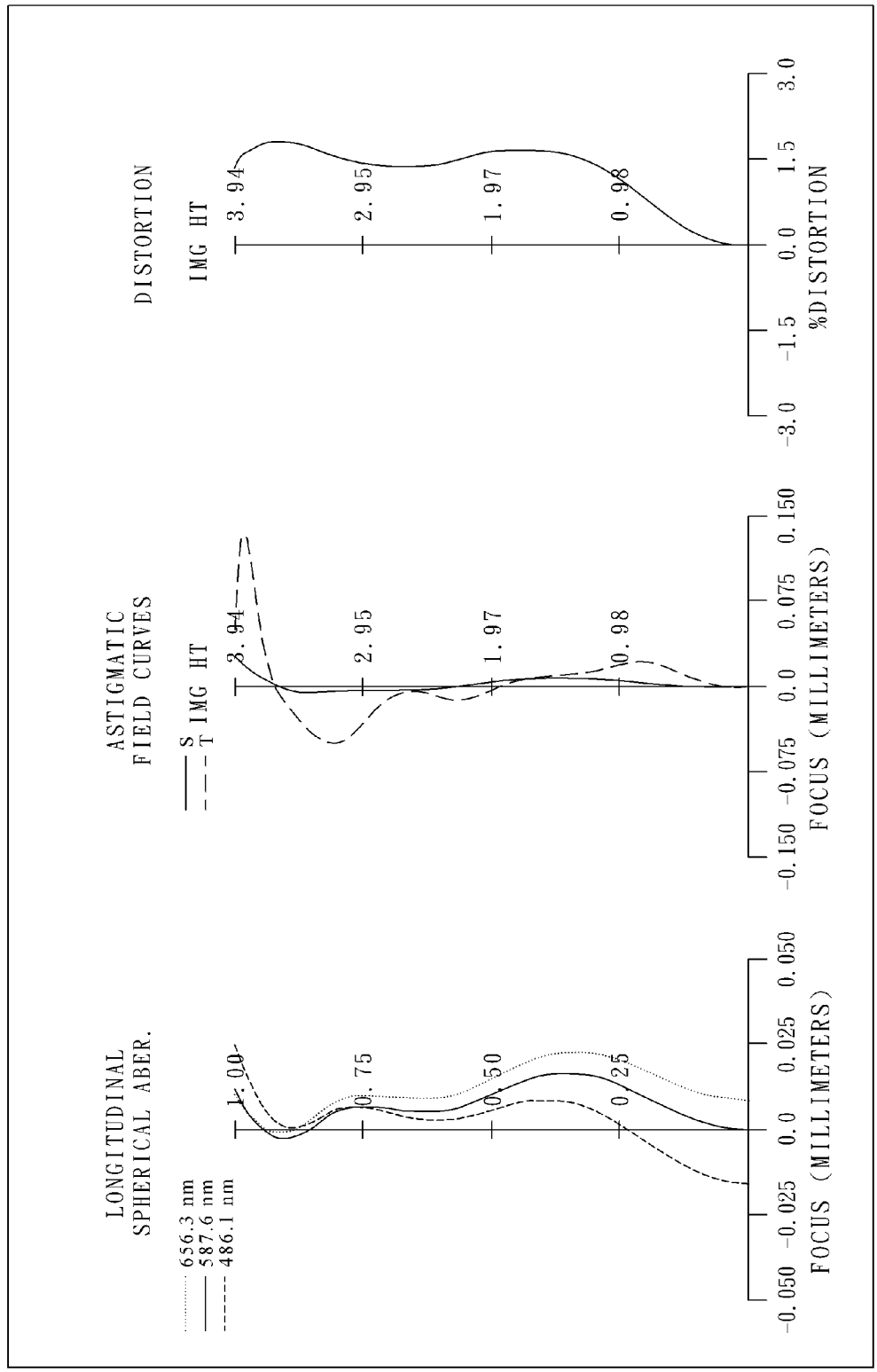
FIG. 6B shows spherical aberration curves, astigmatic field curves and a distortion curve of the image capturing device according to the 6th embodiment.

FIG. 6A is a schematic view of an image capturing device according to the 6th embodiment of the present disclosure. FIG. 6B shows, in order from left to right, spherical aberration curves, astigmatic field curves and a distortion curve of the image capturing device according to the 6th embodiment.

In FIG. 6A, the image capturing device includes the image capturing optical system (not otherwise herein labeled) of the present disclosure and an image sensor 690. The image capturing optical system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein the image capturing optical system has a total of six lens elements (610-660) with refractive power.

The first lens element 610 with positive refractive power has a convex object-side surface 611 in a paraxial region thereof and a concave image-side surface 612 in a paraxial region thereof, which are both aspheric, and the first lens element 610 is made of plastic material.

The second lens element 620 with negative refractive power has a convex object-side surface 621 in a paraxial region thereof and a concave image-side surface 622 in a paraxial region thereof, which are both aspheric, and the second lens element 620 is made of plastic material.

The third lens element 630 with positive refractive power has a convex object-side surface 631 in a paraxial region thereof and a convex image-side surface 632 in a paraxial region thereof, which are both aspheric, and the third lens element 630 is made of plastic material.

The fourth lens element 640 with negative refractive power has a concave object-side surface 641 in a paraxial region thereof and a concave image-side surface 642 in a paraxial region thereof, which are both aspheric, and the fourth lens element 640 is made of plastic material.

The fifth lens element 650 with positive refractive power has a convex object-side surface 651 in a paraxial region thereof and a concave image-side surface 652 in a paraxial region thereof, which are both aspheric, and the fifth lens element 650 is made of plastic material. Furthermore, the image-side surface 652 of the fifth lens element 650 has at least one convex shape in an off-axis region thereof.

The sixth lens element 660 with negative refractive power has a convex object-side surface 661 in a paraxial region thereof and a concave image-side surface 662 in a paraxial region thereof, which are both aspheric, and the sixth lens element 660 is made of plastic material. Furthermore, the image-side surface 662 of the sixth lens element 660 has at least one convex shape in an off-axis region thereof.

The IR-cut filter 670 is made of glass and located between the sixth lens element 660 and the image surface 680, and will not affect the focal length of the image capturing optical system. The image sensor 690 is disposed on the image surface 680 of the image capturing optical system.

The detailed optical data of the 6th embodiment are shown in Table 11 and the aspheric surface data are shown in Table 12 below.

TABLE 11

(Embodiment 6)
f = 4.65 mm, Fno = 2.06, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.432 | | | | |
| 2 | Lens 1 | 1.727 | ASP | 0.603 | Plastic | 1.544 | 55.9 | 3.97 |
| 3 | | 7.524 | ASP | 0.072 | | | | |
| 4 | Lens 2 | 4.109 | ASP | 0.250 | Plastic | 1.639 | 23.5 | −8.74 |
| 5 | | 2.311 | ASP | 0.294 | | | | |
| 6 | Lens 3 | 8.878 | ASP | 0.522 | Plastic | 1.544 | 55.9 | 12.22 |
| 7 | | −25.904 | ASP | 0.498 | | | | |
| 8 | Lens 4 | −17.457 | ASP | 0.300 | Plastic | 1.639 | 23.5 | −16.70 |
| 9 | | 27.658 | ASP | 0.188 | | | | |
| 10 | Lens 5 | 4.842 | ASP | 0.569 | Plastic | 1.639 | 23.5 | 155.79 |
| 11 | | 4.857 | ASP | 0.296 | | | | |
| 12 | Lens 6 | 2.630 | ASP | 0.812 | Plastic | 1.544 | 55.9 | −17.43 |
| 13 | | 1.835 | ASP | 0.500 | | | | |
| 14 | IR-filter | Plano | | 0.210 | Glass | 1.517 | 64.2 | — |
| 15 | | Plano | | 0.308 | | | | |
| 16 | Image | Plano | | — | | | | |

Note:
Reference wavelength is 587.6 nm (d-line).

TABLE 12

Aspheric Coefficients

| Surface # | | | | | |
|---|---|---|---|---|---|
| 2 | 3 | 4 | 5 | 6 | 7 |
| k = 6.0874E−01 | −3.7106E+01 | −2.9156E+01 | −1.9144E+01 | −1.0000E+00 | 5.0000E+00 |
| A4 = −9.5049E−03 | −1.1616E−01 | −1.7085E−01 | 6.6138E−02 | −5.0124E−02 | −1.5456E−02 |
| A6 = −2.1945E−02 | 2.5721E−01 | 3.5295E−01 | −6.0530E−02 | 1.4389E−01 | −5.8208E−02 |
| A8 = 4.6860E−02 | −3.2569E−01 | −4.2305E−01 | 1.8616E−01 | −5.0766E−01 | 2.0659E−01 |
| A10 = −7.0167E−02 | 2.6615E−01 | 3.3683E−01 | −2.5251E−01 | 1.0000E+00 | −4.2646E−01 |
| A12 = 4.8758E−02 | −1.2115E−01 | −1.5593E−01 | 1.7905E−01 | −1.0939E+00 | 4.6221E−01 |
| A14 = −1.4041E−02 | 2.1429E−02 | 2.9114E−02 | −4.5610E−02 | 6.2593E−01 | −2.5474E−01 |
| A16 = | | | | −1.4105E−01 | 5.7880E−02 |

| Surface # | | | | | |
|---|---|---|---|---|---|
| 8 | 9 | 10 | 11 | 12 | 13 |
| k = −5.9535E+00 | −7.8321E+00 | −5.9144E+01 | −8.3644E+01 | −1.7136E+00 | −2.8741E+00 |
| A4 = −3.6137E−02 | −1.0471E−02 | 8.5717E−02 | 2.2625E−02 | −2.1031E−01 | −1.1931E−01 |
| A6 = 8.7364E−03 | −7.5853E−02 | −1.4858E−01 | −4.1223E−02 | 6.5758E−02 | 4.1872E−02 |
| A8 = −3.1274E−02 | 6.7860E−02 | 9.1199E−02 | 1.7061E−02 | −1.1600E−02 | −1.1217E−02 |
| A10 = 2.0951E−02 | −3.0388E−02 | −3.5229E−02 | −4.2401E−03 | 1.5079E−03 | 1.9721E−03 |
| A12 = −5.8326E−03 | 7.2835E−03 | 7.3442E−03 | 5.6556E−04 | −1.5284E−04 | −2.0875E−04 |
| A14 = −1.0402E−03 | −7.2649E−04 | −6.0576E−04 | −3.0575E−05 | 1.0179E−05 | 1.2091E−05 |
| A16 = | | | | −3.0677E−07 | −2.9398E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.65 | ΣCT/Td | 0.69 |
| Fno | 2.06 | Sd/Td | 0.90 |
| HFOV [deg.] | 39.8 | Td/Tan(HFOV) [mm] | 5.29 |
| V5 | 23.5 | Yc52 [mm] | 1.11 |
| T34/CT5 | 0.88 | Yc62 [mm] | 1.30 |
| CT5/CT6 | 0.70 | (R11 + R12)/(R11 − R12) | 5.62 |
| f/T56 | 15.71 | | |

7th Embodiment

Figure 7A:
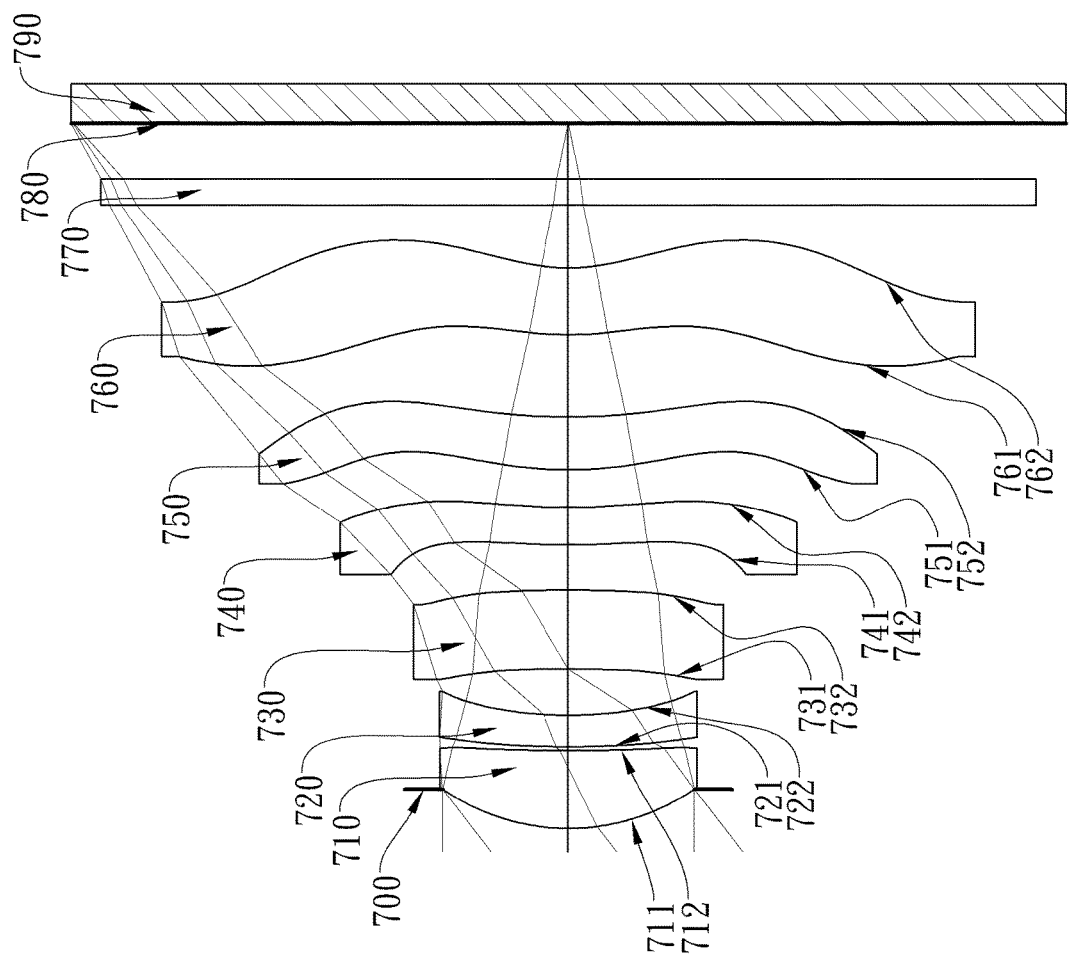
FIG. 7A is a schematic view of an image capturing device according to the 7th embodiment of the present disclosure.
Figure 7B:
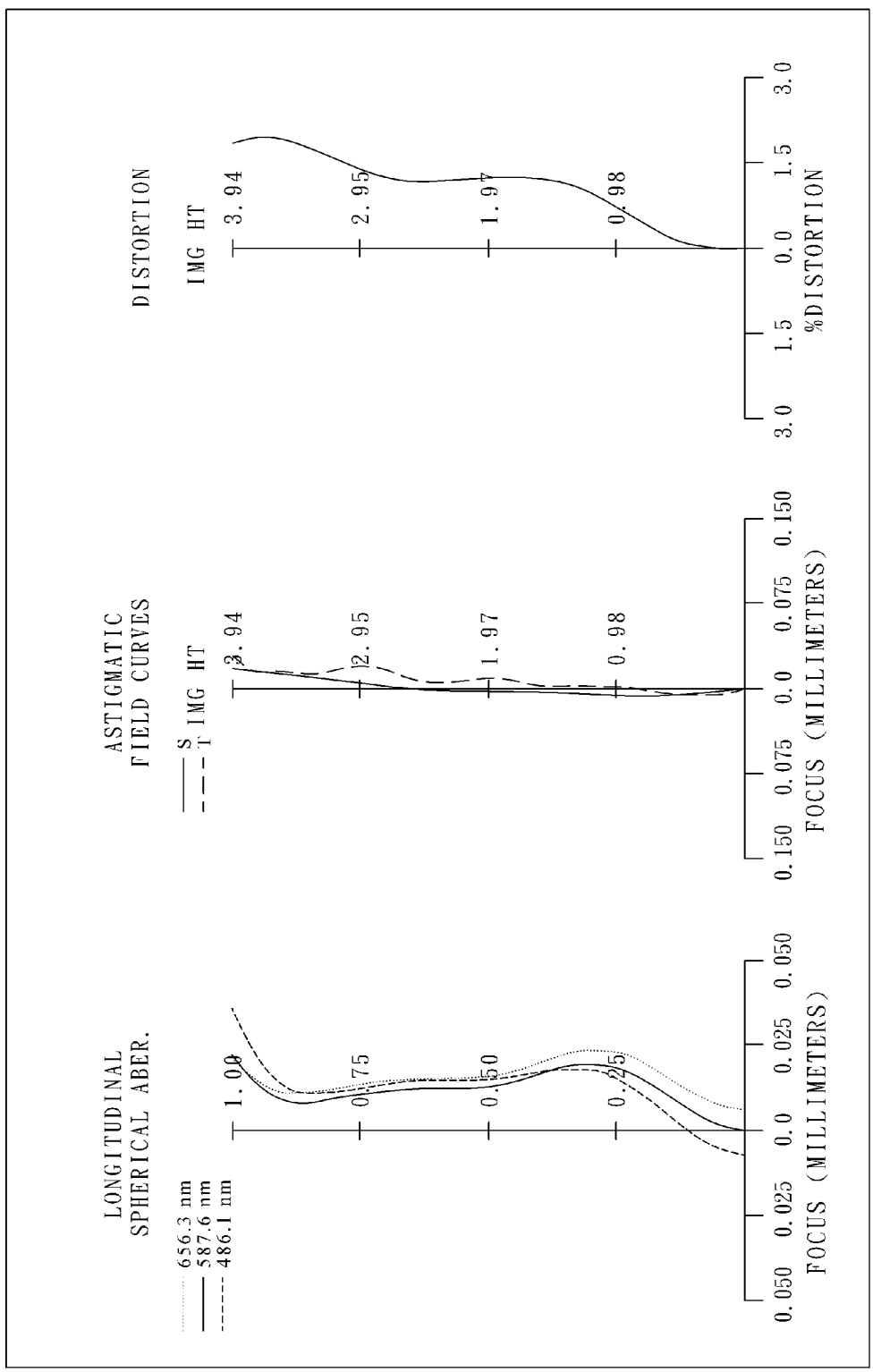
FIG. 7B shows spherical aberration curves, astigmatic field curves and a distortion curve of the image capturing device according to the 7th embodiment.

FIG. 7A is a schematic view of an image capturing device according to the 7th embodiment of the present disclosure. FIG. 7B shows, in order from left to right, spherical aberration curves, astigmatic field curves and a distortion curve of the image capturing device according to the 7th embodiment.

In FIG. 7A, the image capturing device includes the image capturing optical system (not otherwise herein labeled) of the present disclosure and an image sensor 790. The image capturing optical system includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the image capturing optical system has a total of six lens elements (710-760) with refractive power.

The first lens element 710 with positive refractive power has a convex object-side surface 711 in a paraxial region thereof and a concave image-side surface 712 in a paraxial region thereof, which are both aspheric, and the first lens element 710 is made of glass material.

The second lens element 720 with negative refractive power has a convex object-side surface 721 in a paraxial region thereof and a concave image-side surface 722 in a paraxial region thereof, which are both aspheric, and the second lens element 720 is made of glass material.

The third lens element 730 with negative refractive power has a concave object-side surface 731 in a paraxial region thereof and a convex image-side surface 732 in a paraxial region thereof, which are both aspheric, and the third lens element 730 is made of plastic material.

The fourth lens element 740 with negative refractive power has a convex object-side surface 741 in a paraxial region thereof and a concave image-side surface 742 in a paraxial region thereof, which are both aspheric, and the fourth lens element 740 is made of plastic material.

The fifth lens element 750 with positive refractive power has a convex object-side surface 751 in a paraxial region thereof and a concave image-side surface 752 in a paraxial region thereof, which are both aspheric, and the fifth lens element 750 is made of plastic material. Furthermore, the image-side surface 752 of the fifth lens element 750 has at least one convex shape in an off-axis region thereof.

The sixth lens element 760 with negative refractive power has a convex object-side surface 761 in a paraxial region thereof and a concave image-side surface 762 in a paraxial region thereof, which are both aspheric, and the sixth lens element 760 is made of plastic material. Furthermore, the image-side surface 762 of the sixth lens element 760 has at least one convex shape in an off-axis region thereof.

The IR-cut filter 770 is made of glass and located between the sixth lens element 760 and the image surface 780, and will not affect the focal length of the image capturing optical system. The image sensor 790 is disposed on the image surface 780 of the image capturing optical system.

The detailed optical data of the 7th embodiment are shown in Table 13 and the aspheric surface data are shown in Table 14 below.

TABLE 13

(Embodiment 7)
f = 5.00 mm, Fno = 2.50, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.311 | | | | |
| 2 | Lens 1 | 1.750 | ASP | 0.621 | Glass | 1.587 | 59.6 | 3.46 |
| 3 | | 11.044 | ASP | 0.030 | | | | |
| 4 | Lens 2 | 6.079 | ASP | 0.250 | Glass | 1.839 | 23.9 | −7.60 |
| 5 | | 3.054 | ASP | 0.368 | | | | |
| 6 | Lens 3 | −15.179 | ASP | 0.626 | Plastic | 1.639 | 23.5 | −233.10 |
| 7 | | −17.173 | ASP | 0.359 | | | | |
| 8 | Lens 4 | 5.721 | ASP | 0.300 | Plastic | 1.639 | 23.5 | −37.64 |
| 9 | | 4.528 | ASP | 0.301 | | | | |
| 10 | Lens 5 | 3.274 | ASP | 0.420 | Plastic | 1.544 | 55.9 | 14.65 |
| 11 | | 5.305 | ASP | 0.652 | | | | |
| 12 | Lens 6 | 2.454 | ASP | 0.531 | Plastic | 1.535 | 55.7 | −8.67 |
| 13 | | 1.484 | ASP | 0.500 | | | | |
| 14 | IR-filter | Plano | | 0.210 | Glass | 1.517 | 64.2 | — |
| 15 | | Plano | | 0.440 | | | | |
| 16 | Image | Plano | | — | | | | |

Note:
Reference wavelength is 587.6 nm (d-line).

TABLE 14

Aspheric Coefficients

| Surface # | | | | | |
|---|---|---|---|---|---|
| 2 | 3 | 4 | 5 | 6 | 7 |
| k = 3.9940E−01 | −1.0000E+00 | −4.2791E+00 | −1.7097E+01 | −6.7461E+00 | 5.0000E+00 |
| A4 = −1.2724E−02 | −1.1504E−01 | −1.1533E−01 | 3.9095E−02 | −5.7860E−02 | −5.7356E−02 |
| A6 = 3.9968E−02 | 3.4539E−01 | 3.4470E−01 | 1.3803E−01 | 1.5526E−02 | 1.3568E−02 |
| A8 = −1.7666E−01 | −4.2685E−01 | −3.9918E−01 | 1.5874E−01 | −4.6885E−02 | −2.1107E−02 |
| A10 = 3.8334E−01 | 5.0761E−02 | 1.8439E−02 | −5.9467E−01 | 7.0110E−02 | 1.5923E−02 |
| A12 = −4.7327E−01 | 4.8979E−01 | 5.4695E−01 | 9.8709E−01 | −7.3563E−02 | 1.1049E−03 |
| A14 = 3.0670E−01 | −5.7539E−01 | −6.3186E−01 | −7.8651E−01 | 6.2634E−02 | −6.3170E−03 |
| A16 = −8.3760E−02 | 2.0558E−01 | 2.2904E−01 | 2.4926E−01 | −1.6300E−02 | 3.6581E−03 |

| Surface # | | | | | |
|---|---|---|---|---|---|
| 8 | 9 | 10 | 11 | 12 | 13 |
| k = −1.0000E+01 | −7.8368E+00 | −9.6010E+00 | −8.0928E+01 | −1.6396E+00 | −4.7597E+00 |
| A4 = −7.8166E−02 | −5.9078E−02 | 3.9021E−02 | 7.3700E−02 | −1.8733E−01 | −8.8876E−02 |
| A6 = 2.6402E−02 | −4.8141E−03 | −7.0588E−02 | −6.8110E−02 | 6.3594E−02 | 2.6878E−02 |
| A8 = −3.8313E−02 | 1.6513E−02 | 3.2168E−02 | 2.5533E−02 | −1.2236E−02 | −6.0829E−03 |
| A10 = 2.6813E−02 | −1.0143E−02 | −9.4543E−03 | −5.7394E−03 | 1.5037E−03 | 9.1147E−04 |
| A12 = −1.3576E−02 | 3.0472E−03 | 1.9013E−03 | 7.7092E−04 | −1.1614E−04 | −8.0814E−05 |
| A14 = 3.0677E−03 | −4.0138E−04 | −2.1747E−04 | −5.6229E−05 | 5.1448E−06 | 3.8830E−06 |
| A16 = −2.4680E−04 | 1.3082E−05 | 1.0215E−05 | 1.7051E−06 | −1.0014E−07 | −7.8812E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.00 | ΣCT/Td | 0.62 |
| Fno | 2.50 | Sd/Td | 0.93 |
| HFOV [deg.] | 37.6 | Td/Tan(HFOV) [mm] | 5.79 |

-continued

| 7th Embodiment | | | |
|---|---|---|---|
| V5 | 55.9 | Yc52 [mm] | 1.40 |
| T34/CT5 | 0.85 | Yc62 [mm] | 1.37 |
| CT5/CT6 | 0.79 | (R11 + R12)/(R11 − R12) | 4.06 |
| f/T56 | 7.67 | | |

8th Embodiment

Figure 8A:
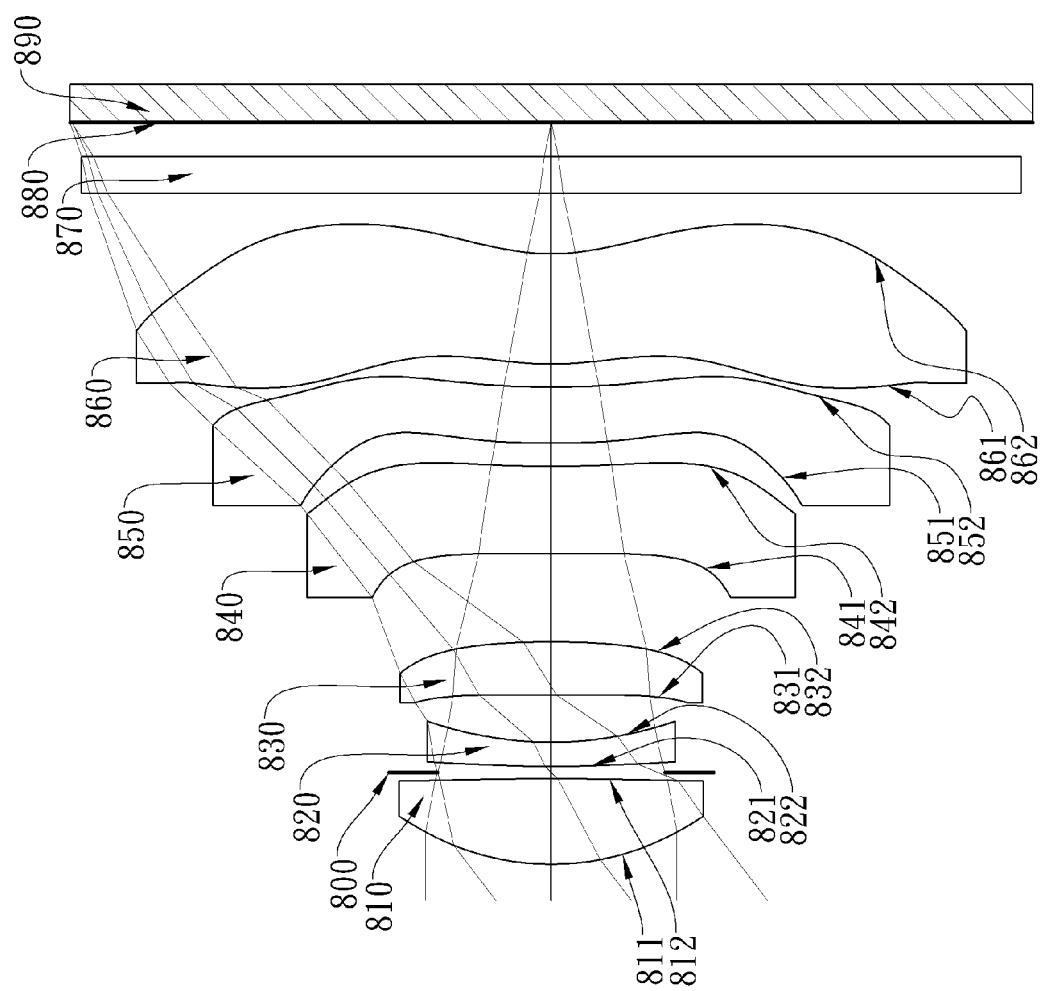
FIG. 8A is a schematic view of an image capturing device according to the 8th embodiment of the present disclosure.
Figure 8B:
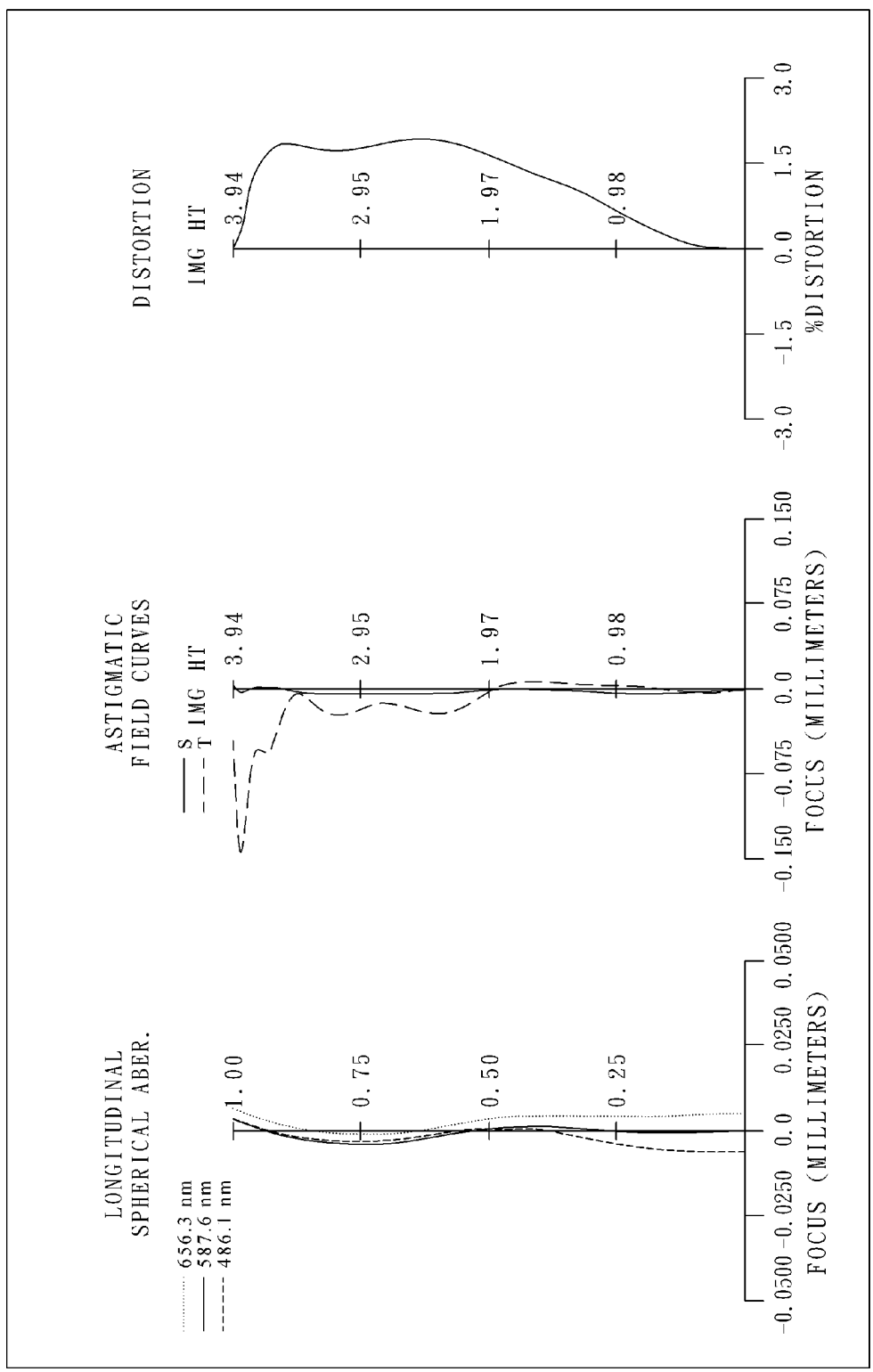
FIG. 8B shows spherical aberration curves, astigmatic field curves and a distortion curve of the image capturing device according to the 8th embodiment.

FIG. 8A is a schematic view of an image capturing device according to the 8th embodiment of the present disclosure. FIG. 8B shows, in order from left to right, spherical aberration curves, astigmatic field curves and a distortion curve of the image capturing device according to the 8th embodiment.

In FIG. 8A, the image capturing device includes the image capturing optical system (not otherwise herein labeled) of the present disclosure and an image sensor 890. The image capturing optical system includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the image capturing optical system has a total of six lens elements (810-860) with refractive power.

The first lens element 810 with positive refractive power has a convex object-side surface 811 in a paraxial region thereof and a convex image-side surface 812 in a paraxial region thereof, which are both aspheric, and the first lens element 810 is made of plastic material.

The second lens element 820 with negative refractive power has a convex object-side surface 821 in a paraxial region thereof and a concave image-side surface 822 in a paraxial region thereof, which are both aspheric, and the second lens element 820 is made of plastic material.

The third lens element 830 with positive refractive power has a convex object-side surface 831 in a paraxial region thereof and a convex image-side surface 832 in a paraxial region thereof, which are both aspheric, and the third lens element 830 is made of plastic material.

The fourth lens element 840 with negative refractive power has a convex object-side surface 841 in a paraxial region thereof and a concave image-side surface 842 in a paraxial region thereof, which are both aspheric, and the fourth lens element 840 is made of plastic material.

The fifth lens element 850 with negative refractive power has a convex object-side surface 851 in a paraxial region thereof and a concave image-side surface 852 in a paraxial region thereof, which are both aspheric, and the fifth lens element 850 is made of plastic material. Furthermore, the image-side surface 852 of the fifth lens element 850 has at least one convex shape in an off-axis region thereof.

The sixth lens element 860 with negative refractive power has a convex object-side surface 861 in a paraxial region thereof and a concave image-side surface 862 in a paraxial region thereof, which are both aspheric, and the sixth lens element 860 is made of plastic material. Furthermore, the image-side surface 862 of the sixth lens element 860 has at least one convex shape in an off-axis region thereof.

The IR-cut filter 870 is made of glass and located between the sixth lens element 860 and the image surface 880, and will not affect the focal length of the image capturing optical system. The image sensor 890 is disposed on the image surface 880 of the image capturing optical system.

The detailed optical data of the 8th embodiment are shown in Table 15 and the aspheric surface data are shown in Table 16 below.

TABLE 15

(Embodiment 8)
f = 5.17 mm, Fno = 2.50, HFOV = 37.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.123 | ASP | 0.703 | Plastic | 1.544 | 55.9 | 3.83 |
| 2 | | −104.783 | ASP | 0.053 | | | | |
| 3 | Ape. Stop | Plano | | 0.047 | | | | |
| 4 | Lens 2 | 5.728 | ASP | 0.200 | Plastic | 1.650 | 21.5 | −6.86 |
| 5 | | 2.474 | ASP | 0.390 | | | | |
| 6 | Lens 3 | 68.452 | ASP | 0.437 | Plastic | 1.565 | 40.0 | 11.59 |
| 7 | | −7.226 | ASP | 0.726 | | | | |
| 8 | Lens 4 | 47.872 | ASP | 0.718 | Plastic | 1.565 | 40.0 | −18.32 |
| 9 | | 8.464 | ASP | 0.191 | | | | |
| 10 | Lens 5 | 8.789 | ASP | 0.463 | Plastic | 1.565 | 40.0 | −100.27 |
| 11 | | 7.464 | ASP | 0.189 | | | | |
| 12 | Lens 6 | 2.636 | ASP | 0.907 | Plastic | 1.535 | 55.7 | −16.60 |
| 13 | | 1.789 | ASP | 0.500 | | | | |
| 14 | IR-filter | Plano | | 0.300 | Glass | 1.517 | 64.2 | |
| 15 | | Plano | | 0.279 | | | | |
| 16 | Image | Plano | | — | | | | |

Note:
Reference wavelength is 587.6 nm (d-line). The effective radius of Surface 1 is 1.250 mm

TABLE 16

Aspheric Coefficients

| | Surface # | | | | | |
|---|---|---|---|---|---|---|
| | 1 | 2 | 4 | 5 | 6 | 7 |
| k = | −1.0462E+00 | −1.0000E+00 | −7.0003E+01 | −2.4025E+01 | −9.0000E+01 | 5.0000E+00 |
| A4 = | 1.2825E−02 | −6.5407E−02 | −1.4770E−01 | 3.4865E−02 | −4.2714E−02 | −3.4274E−02 |
| A6 = | 1.7526E−03 | 1.6138E−01 | 3.4686E−01 | 2.6148E−02 | 4.0648E−02 | −1.8027E−02 |
| A8 = | −6.3396E−03 | −2.0850E−01 | −4.6499E−01 | −4.2102E−02 | −9.8897E−02 | 4.1491E−02 |
| A10 = | 1.4378E−02 | 1.5729E−01 | 3.9025E−01 | 4.5329E−02 | 1.3439E−01 | −7.9435E−02 |
| A12 = | −1.6601E−02 | −6.4020E−02 | −1.8633E−01 | −3.1768E−02 | −1.1929E−01 | 6.9874E−02 |
| A14 = | 9.5625E−03 | 9.6046E−03 | 3.7147E−02 | 9.6605E−03 | 5.4149E−02 | −3.3115E−02 |
| A16 = | −2.3060E−03 | 1.5589E−04 | −3.0595E−12 | −1.2083E−10 | −9.3445E−03 | 6.4882E−03 |

TABLE 16-continued

Aspheric Coefficients

| Surface # | | | | | |
|---|---|---|---|---|---|
| 8 | 9 | 10 | 11 | 12 | 13 |
| k = 1.0000E+00 | −2.0407E+00 | −1.0000E+00 | −9.0000E+01 | −2.3823E+00 | −5.0270E+00 |
| A4 = −4.1108E−02 | −1.2277E−02 | 8.5810E−02 | 3.4730E−02 | −1.6296E−01 | −5.7676E−02 |
| A6 = −2.5713E−03 | −2.9421E−02 | −9.7907E−02 | −2.0928E−02 | 5.0167E−02 | 1.2771E−02 |
| A8 = 1.2760E−02 | 1.7285E−02 | 4.3341E−02 | −1.6424E−03 | −7.9995E−03 | −1.6160E−03 |
| A10 = −2.2126E−02 | −6.2456E−03 | −1.4166E−02 | 2.5273E−03 | 8.1100E−04 | 8.6799E−05 |
| A12 = 1.1494E−02 | 1.1389E−03 | 2.5707E−03 | −5.5614E−04 | −5.7985E−05 | −6.9483E−07 |
| A14 = −2.5791E−03 | −7.5720E−05 | −1.3898E−04 | 5.1482E−05 | 2.8668E−06 | 1.1223E−08 |
| A16 = 2.2220E−06 | 9.4077E−08 | −8.9715E−06 | −1.8111E−06 | −7.2134E−08 | −5.2112E−09 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.17 | ΣCT/Td | 0.68 |
| Fno | 2.50 | Sd/Td | 0.85 |
| HFOV [deg.] | 37.3 | Td/Tan(HFOV) [mm] | 6.59 |
| V5 | 40.0 | Yc52 [mm] | 1.33 |
| T34/CT5 | 1.57 | Yc62 [mm] | 1.61 |
| CT5/CT6 | 0.51 | (R11 + R12)/(R11 − R12) | 5.22 |
| f/T56 | 27.35 | | |

9th Embodiment

Figure 9A:
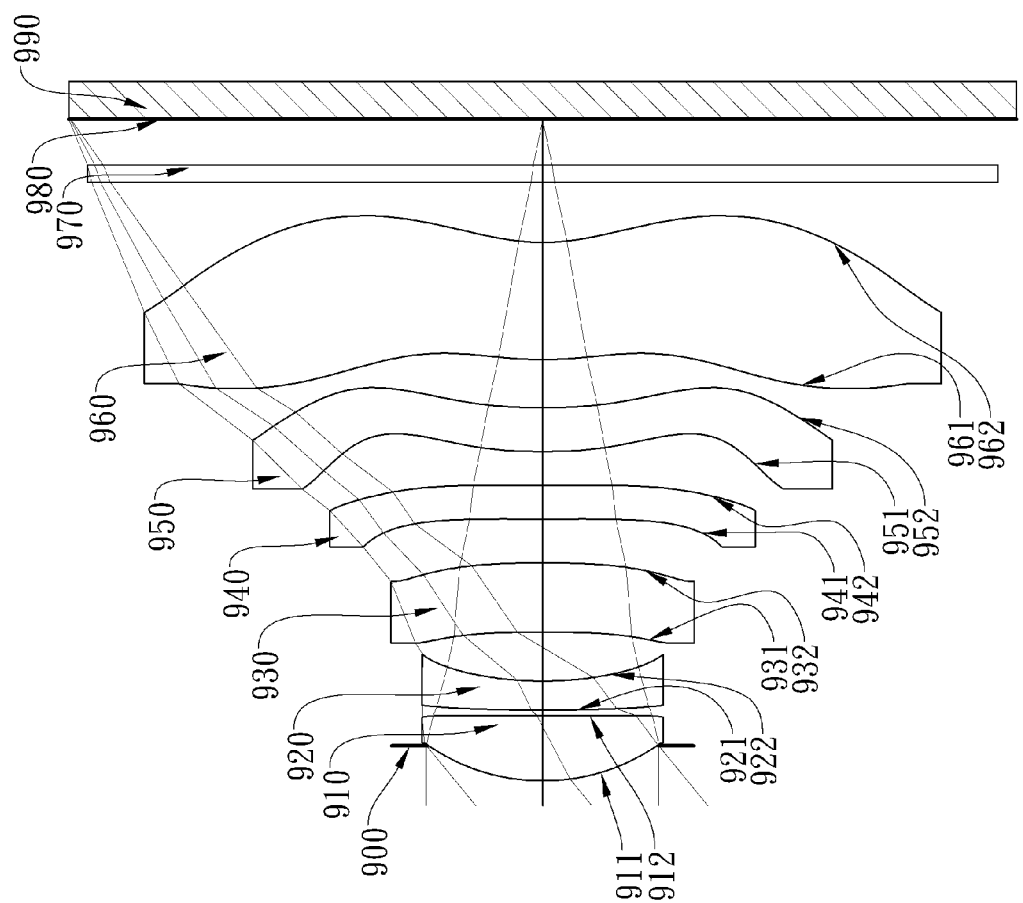
FIG. 9A is a schematic view of an image capturing device according to the 9th embodiment of the present disclosure.
Figure 9B:
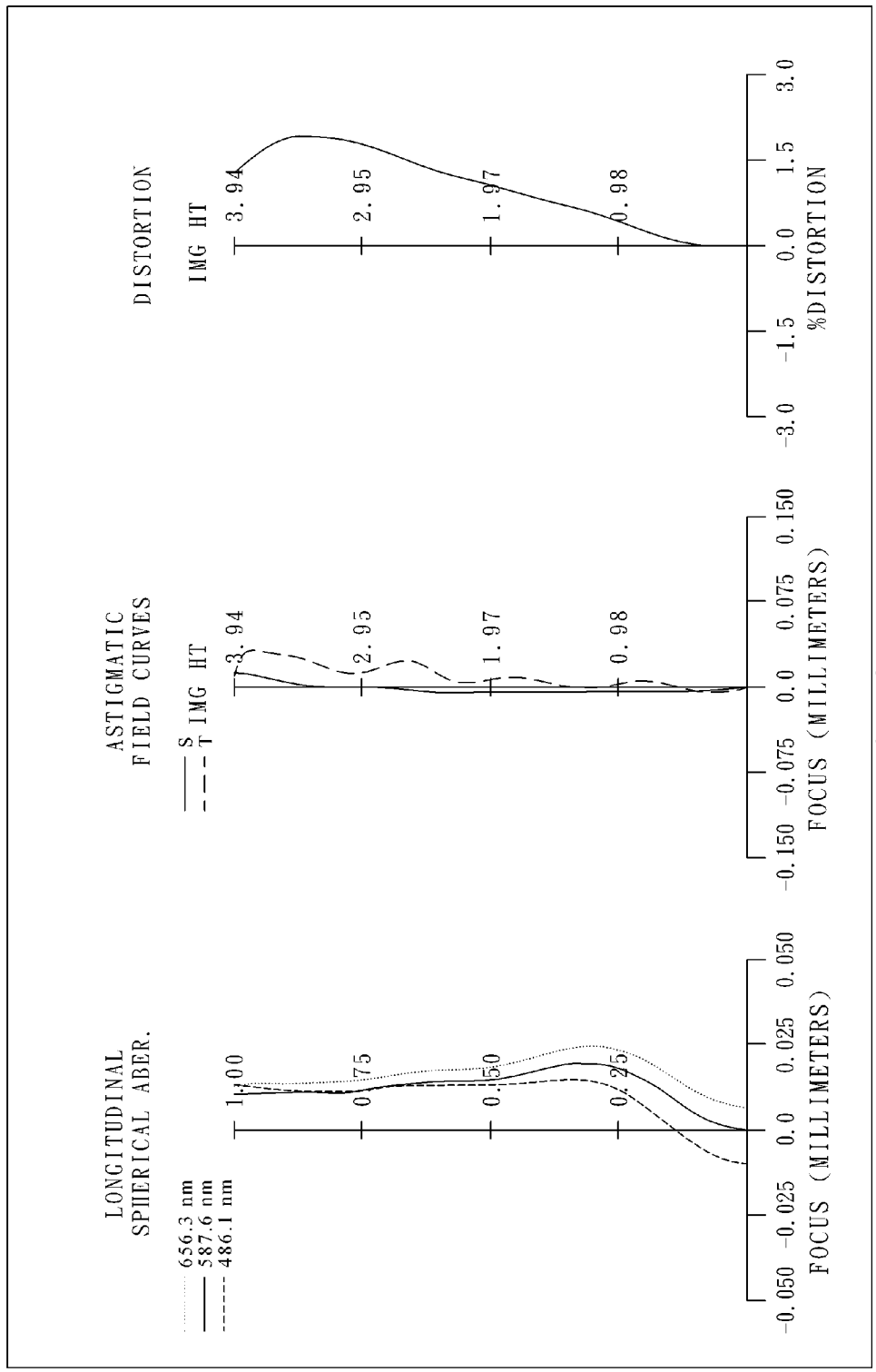
FIG. 9B shows spherical aberration curves, astigmatic field curves and a distortion curve of the image capturing device according to the 9th embodiment.

FIG. 9A is a schematic view of an image capturing device according to the 9th embodiment of the present disclosure. FIG. 9B shows, in order from left to right, spherical aberration curves, astigmatic field curves and a distortion curve of the image capturing device according to the 9th embodiment.

In FIG. 9A, the image capturing device includes the image capturing optical system (not otherwise herein labeled) of the present disclosure and an image sensor 990. The image capturing optical system includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image surface 980, wherein the image capturing optical system has a total of six lens elements (910-960) with refractive power.

The first lens element 910 with positive refractive power has a convex object-side surface 911 in a paraxial region thereof and a concave image-side surface 912 in a paraxial region thereof, which are both aspheric, and the first lens element 910 is made of plastic material.

The second lens element 920 with negative refractive power has a convex object-side surface 921 in a paraxial region thereof and a concave image-side surface 922 in a paraxial region thereof, which are both aspheric, and the second lens element 920 is made of plastic material.

The third lens element 930 with positive refractive power has a concave object-side surface 931 in a paraxial region thereof and a convex image-side surface 932 in a paraxial region thereof, which are both aspheric, and the third lens element 930 is made of plastic material.

The fourth lens element 940 with positive refractive power has a convex object-side surface 941 in a paraxial region thereof and a concave image-side surface 942 in a paraxial region thereof, which are both aspheric, and the fourth lens element 940 is made of plastic material.

The fifth lens element 950 with negative refractive power has a convex object-side surface 951 in a paraxial region thereof and a concave image-side surface 952 in a paraxial region thereof, which are both aspheric, and the fifth lens element 950 is made of plastic material. Furthermore, the image-side surface 952 of the fifth lens element 950 has at least one convex shape in an off-axis region thereof.

The sixth lens element 960 with negative refractive power has a convex object-side surface 961 in a paraxial region thereof and a concave image-side surface 962 in a paraxial region thereof, which are both aspheric, and the sixth lens element 960 is made of plastic material. Furthermore, the image-side surface 962 of the sixth lens element 960 has at least one convex shape in an off-axis region thereof.

The IR-cut filter 970 is made of glass and located between the sixth lens element 960 and the image surface 980, and will not affect the focal length of the image capturing optical system. The image sensor 990 is disposed on the image surface 980 of the image capturing optical system.

The detailed optical data of the 9th embodiment are shown in Table 17 and the aspheric surface data are shown in Table 18 below.

TABLE 17

(Embodiment 9)
f = 4.74 mm, Fno = 2.45, HFOV = 39.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.293 | | | | |

TABLE 17-continued (Embodiment 9)
f = 4.74 mm, Fno = 2.45, HFOV = 39.3 deg.

| Surface # | | Curvature Radius | | Thickness | Material | Index | Abbe # | Focal Length |
|---|---|---|---|---|---|---|---|---|
| 2 | Lens 1 | 1.702 | ASP | 0.545 | Plastic | 1.544 | 55.9 | 3.21 |
| 3 | | 56.015 | ASP | 0.042 | | | | |
| 4 | Lens 2 | 8.354 | ASP | 0.244 | Plastic | 1.639 | 23.5 | −6.41 |
| 5 | | 2.717 | ASP | 0.408 | | | | |
| 6 | Lens 3 | −14.143 | ASP | 0.578 | Plastic | 1.544 | 55.9 | 49.46 |
| 7 | | −9.405 | ASP | 0.364 | | | | |
| 8 | Lens 4 | 42.947 | ASP | 0.280 | Plastic | 1.639 | 23.5 | 132.07 |
| 9 | | 87.224 | ASP | 0.284 | | | | |
| 10 | Lens 5 | 5.168 | ASP | 0.365 | Plastic | 1.544 | 55.9 | −136.89 |
| 11 | | 4.713 | ASP | 0.402 | | | | |
| 12 | Lens 6 | 2.875 | ASP | 0.977 | Plastic | 1.544 | 55.9 | −11.68 |
| 13 | | 1.742 | ASP | 0.500 | | | | |
| 14 | IR-filter | Plano | | 0.145 | Glass | 1.517 | 64.2 | — |
| 15 | | Plano | | 0.381 | | | | |
| 16 | Image | Plano | | — | | | | |

Note:
Reference wavelength is 587.6 nm (d-line).

TABLE 18

Aspheric Coefficients

| | Surface # | | | | | |
|---|---|---|---|---|---|---|
| | 2 | 3 | 4 | 5 | 6 | 7 |
| k = | 4.6754E−01 | −8.9924E+01 | −2.0345E+01 | −1.7610E+01 | −6.6863E+00 | 5.0000E+00 |
| A4 = | −1.5553E−02 | −9.3454E−02 | −1.4551E−01 | 4.3283E−02 | −6.4504E−02 | −5.9517E−02 |
| A6 = | 7.0787E−02 | 2.8211E−01 | 3.8825E−01 | 4.8441E−02 | 5.3038E−02 | 5.8016E−02 |
| A8 = | −3.0187E−01 | −4.2109E−01 | −5.6211E−01 | −5.4627E−02 | −2.2807E−01 | −1.1397E−01 |
| A10 = | 6.8049E−01 | 2.8502E−01 | 4.4814E−01 | 7.7807E−02 | 5.0455E−01 | 1.2344E−01 |
| A12 = | −8.8599E−01 | 3.5005E−02 | −3.8413E−02 | −5.8146E−02 | −6.4242E−01 | −7.9113E−02 |
| A14 = | 6.1012E−01 | −1.7112E−01 | −1.9522E−01 | 5.9930E−02 | 4.4687E−01 | 2.9489E−02 |
| A16 = | −1.7748E−01 | 6.1725E−02 | 9.0608E−02 | −2.6765E−02 | −1.1930E−01 | −3.8134E−03 |

| | Surface # | | | | | |
|---|---|---|---|---|---|---|
| | 8 | 9 | 10 | 11 | 12 | 13 |
| k = | −7.1002E+00 | −9.9999E+00 | −1.2399E+01 | −8.6018E+01 | −1.2713E+00 | −4.9474E+00 |
| A4 = | −6.2386E−02 | 1.3891E−02 | 1.6645E−01 | 1.3513E−01 | −1.7952E−01 | −7.5551E−02 |
| A6 = | 6.7408E−02 | −1.0258E−01 | −2.1949E−01 | −1.2537E−01 | 6.1721E−02 | 2.5464E−02 |
| A8 = | −8.7726E−02 | 1.1176E−01 | 1.3299E−01 | 5.5151E−02 | −1.1833E−02 | −6.6955E−03 |
| A10 = | 6.6806E−02 | −6.6659E−02 | −5.3145E−02 | −1.6057E−02 | 1.4351E−03 | 1.1465E−03 |
| A12 = | −2.8761E−02 | 2.2986E−02 | 1.2373E−02 | 2.9569E−03 | −1.1070E−04 | −1.1697E−04 |
| A14 = | 3.3485E−03 | −4.2368E−03 | −1.4627E−03 | −3.0120E−04 | 5.0269E−06 | 6.4115E−06 |
| A16 = | 1.7946E−03 | 3.1904E−04 | 6.7748E−05 | 1.2769E−05 | −1.0318E−07 | −1.4442E−07 |
| A18 = | −5.0382E−04 | | | | | |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.74 | ΣCT/Td | 0.67 |
| Fno | 2.45 | Sd/Td | 0.93 |
| HFOV [deg.] | 39.3 | Td/Tan(HFOV) [mm] | 5.48 |
| V5 | 55.9 | Yc52 [mm] | 1.41 |

-continued

| 9th Embodiment | | | |
|---|---|---|---|
| T34/CT5 | 1.00 | Yc62 [mm] | 1.49 |
| CT5/CT6 | 0.37 | (R11 + R12)/(R11 − R12) | 4.08 |
| f/T56 | 11.79 | | |

10th Embodiment

Figure 10A:
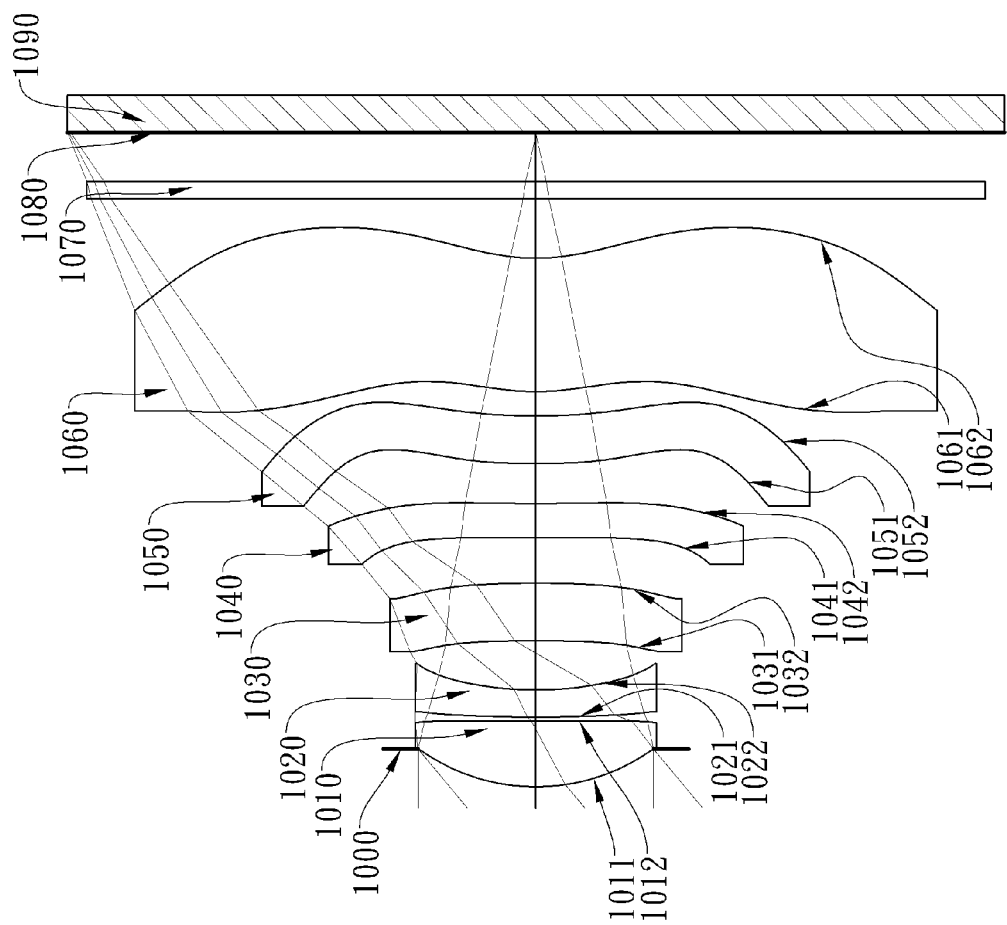
FIG. 10A is a schematic view of an image capturing device according to the 10th embodiment of the present disclosure.
Figure 10B:
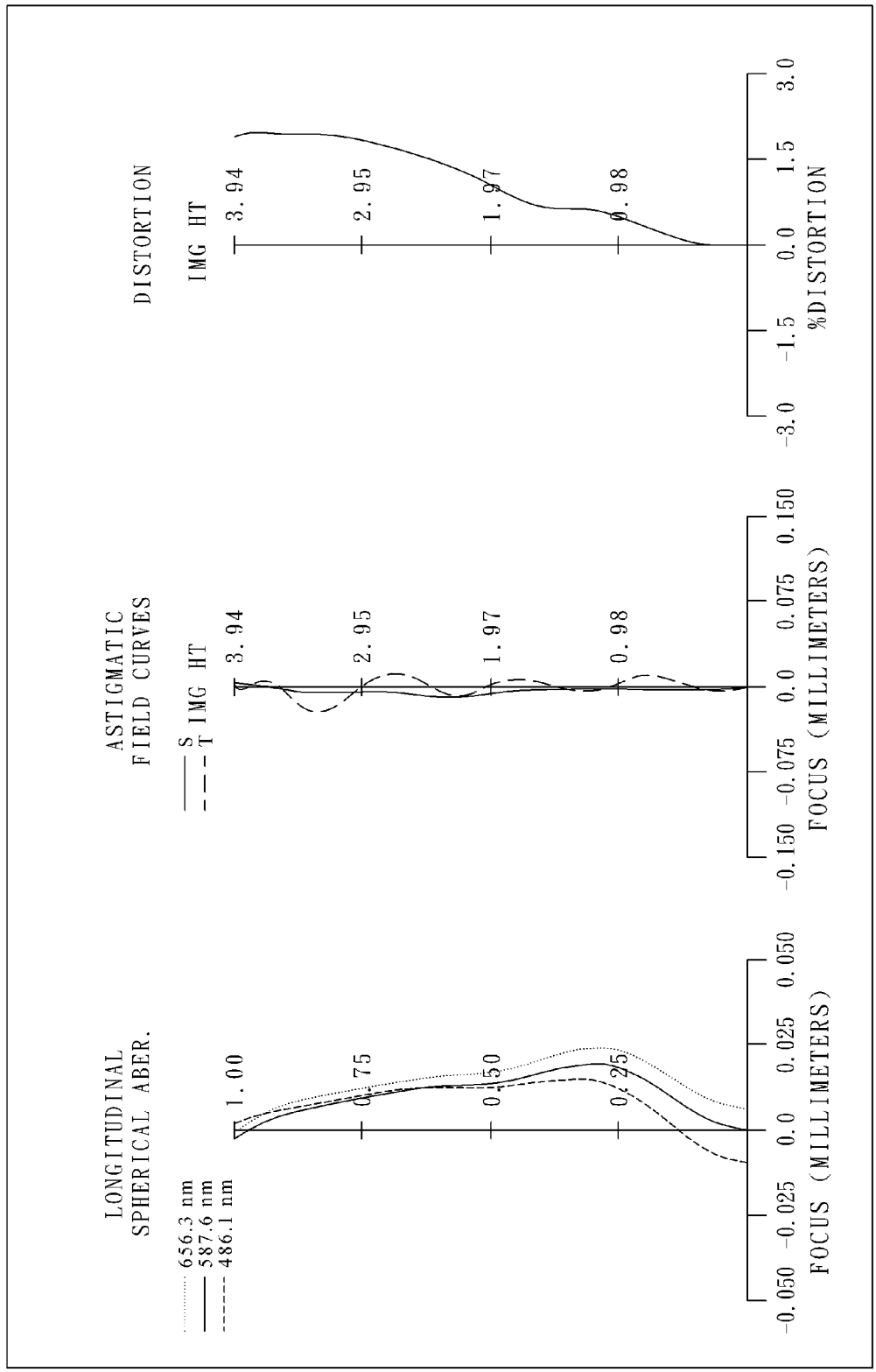
FIG. 10B shows spherical aberration curves, astigmatic field curves and a distortion curve of the image capturing device according to the 10th embodiment.

FIG. 10A is a schematic view of an image capturing device according to the 10th embodiment of the present disclosure. FIG. 10B shows, in order from left to right, spherical aberration curves, astigmatic field curves and a distortion curve of the image capturing device according to the 10th embodiment.

In FIG. 10A, the image capturing device includes the image capturing optical system (not otherwise herein labeled) of the present disclosure and an image sensor 1090. The image capturing optical system includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1070 and an image surface 1080, wherein the image capturing optical system has a total of six lens elements (1010-1060) with refractive power.

The first lens element 1010 with positive refractive power has a convex object-side surface 1011 in a paraxial region thereof and a concave image-side surface 1012 in a paraxial region thereof, which are both aspheric, and the first lens element 1010 is made of plastic material.

The second lens element 1020 with negative refractive power has a convex object-side surface 1021 in a paraxial region thereof and a concave image-side surface 1022 in a paraxial region thereof, which are both aspheric, and the second lens element 1020 is made of plastic material.

The third lens element 1030 with positive refractive power has a concave object-side surface 1031 in a paraxial region thereof and a convex image-side surface 1032 in a paraxial region thereof, which are both aspheric, and the third lens element 1030 is made of plastic material.

The fourth lens element 1040 with negative refractive power has a convex object-side surface 1041 in a paraxial region thereof and a concave image-side surface 1042 in a paraxial region thereof, which are both aspheric, and the fourth lens element 1040 is made of plastic material.

The fifth lens element 1050 with negative refractive power has a convex object-side surface 1051 in a paraxial region thereof and a concave image-side surface 1052 in a paraxial region thereof, which are both aspheric, and the fifth lens element 1050 is made of plastic material. Furthermore, the image-side surface 1052 of the fifth lens element 1050 has at least one convex shape in an off-axis region thereof.

The sixth lens element 1060 with positive refractive power has a convex object-side surface 1061 in a paraxial region thereof and a concave image-side surface 1062 in a paraxial region thereof, which are both aspheric, and the sixth lens element 1060 is made of plastic material. Furthermore, the image-side surface 1062 of the sixth lens element 1060 has at least one convex shape in an off-axis region thereof.

The IR-cut filter 1070 is made of glass and located between the sixth lens element 1060 and the image surface 1080, and will not affect the focal length of the image capturing optical system. The image sensor 1090 is disposed on the image surface 1080 of the image capturing optical system.

The detailed optical data of the 10th embodiment are shown in Table 19 and the aspheric surface data are shown in Table 20 below.

TABLE 19

(Embodiment 10)
f = 4.66 mm, Fno = 2.35, HFOV = 39.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.317 | | | | |
| 2 | Lens 1 | 1.700 | ASP | 0.553 | Plastic | 1.544 | 55.9 | 3.24 |
| 3 | | 43.284 | ASP | 0.032 | | | | |
| 4 | Lens 2 | 7.549 | ASP | 0.230 | Plastic | 1.639 | 23.5 | −6.69 |
| 5 | | 2.697 | ASP | 0.415 | | | | |
| 6 | Lens 3 | −16.108 | ASP | 0.485 | Plastic | 1.544 | 55.9 | 67.06 |
| 7 | | −11.294 | ASP | 0.382 | | | | |
| 8 | Lens 4 | 23.836 | ASP | 0.289 | Plastic | 1.639 | 23.5 | −199.31 |
| 9 | | 19.983 | ASP | 0.339 | | | | |
| 10 | Lens 5 | 10.875 | ASP | 0.400 | Plastic | 1.544 | 55.9 | −18.28 |
| 11 | | 5.127 | ASP | 0.206 | | | | |
| 12 | Lens 6 | 2.041 | ASP | 1.124 | Plastic | 1.535 | 55.7 | 122.86 |
| 13 | | 1.702 | ASP | 0.500 | | | | |
| 14 | IR-filter | Plano | | 0.145 | Glass | 1.517 | 64.2 | — |
| 15 | | Plano | | 0.416 | | | | |
| 16 | Image | Plano | | — | | | | |

Note:
Reference wavelength is 587.6 nm (d-line).

TABLE 20

Aspheric Coefficients

| | Surface # | | | | | |
|---|---|---|---|---|---|---|
| | 2 | 3 | 4 | 5 | 6 | 7 |
| k = | 4.4411E−01 | −1.0000E+00 | −1.7334E+01 | −1.6789E+01 | −5.6311E+01 | 3.4231E+00 |
| A4 = | −1.3911E−02 | −9.4652E−02 | −1.4528E−01 | 4.3517E−02 | −6.3227E−02 | −5.5704E−02 |
| A6 = | 6.9754E−02 | 2.8297E−01 | 3.8750E−01 | 4.8850E−02 | 5.0305E−02 | 6.6542E−02 |
| A8 = | −3.0106E−01 | −4.2073E−01 | −5.5951E−01 | −5.6184E−02 | −2.3062E−01 | −1.4061E−01 |
| A10 = | 6.7989E−01 | 2.8274E−01 | 4.4601E−01 | 7.6282E−02 | 5.0366E−01 | 1.4565E−01 |
| A12 = | −8.8599E−01 | 3.5007E−02 | −3.8418E−02 | −5.8146E−02 | −6.4243E−01 | −8.3630E−02 |
| A14 = | 6.1012E−01 | −1.7112E−01 | −1.9522E−01 | 5.9930E−02 | 4.4687E−01 | 2.5897E−02 |
| A16 = | −1.7748E−01 | 6.1725E−02 | 9.0608E−02 | −2.6765E−02 | −1.1930E−01 | −1.7466E−03 |

TABLE 20-continued

Aspheric Coefficients

| | Surface # | | | | | |
|---|---|---|---|---|---|---|
| | 8 | 9 | 10 | 11 | 12 | 13 |
| k = | −1.0000E+01 | −8.4921E+00 | −1.2399E+01 | −8.6018E+01 | −1.5897E+00 | −3.5936E+00 |
| A4 = | −7.0505E−02 | −4.2335E−04 | 2.0324E−01 | 8.1978E−02 | −2.2383E−01 | −8.3422E−02 |
| A6 = | 7.5330E−02 | −8.4903E−02 | −2.6594E−01 | −7.9916E−02 | 8.7011E−02 | 2.6505E−02 |
| A8 = | −8.5283E−02 | 9.5508E−02 | 1.7665E−01 | 3.3811E−02 | −1.9172E−02 | −5.6544E−03 |
| A10 = | 4.8368E−02 | −5.8853E−02 | −7.8583E−02 | −1.0324E−02 | 2.6248E−03 | 7.8744E−04 |
| A12 = | −1.0026E−02 | 2.0732E−02 | 2.1009E−02 | 2.0949E−03 | −2.1966E−04 | −6.8780E−05 |
| A14 = | −5.7603E−03 | −3.8166E−03 | −3.0104E−03 | −2.3958E−04 | 1.0305E−05 | 3.3706E−06 |
| A16 = | 3.9272E−03 | 2.7995E−04 | 1.7860E−04 | 1.1470E−05 | −2.0835E−07 | −6.9739E−08 |
| A18 = | −6.8100E−04 | | | | | |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.66 | ΣCT/Td | 0.69 |
| Fno | 2.35 | Sd/Td | 0.93 |
| HFOV [deg.] | 39.6 | Td/Tan(HFOV) [mm] | 5.39 |
| V5 | 55.9 | Yc52 [mm] | 1.30 |
| T34/CT5 | 0.96 | Yc62 [mm] | 1.66 |
| CT5/CT6 | 0.36 | (R11 + R12)/(R11 − R12) | 11.04 |
| f/T56 | 22.62 | | |

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical system comprising, in order from an object side to an image side:
   a first lens element with positive refractive power having a convex object-side surface in a paraxial region thereof;
   a second lens element with negative refractive power;
   a third lens element;
   a fourth lens element having a concave image-side surface in a paraxial region thereof;
   a fifth lens element having a concave image-side surface in a paraxial region thereof; wherein both of an object-side surface and the image-side surface of the fifth lens element are aspheric, the fifth lens element is made of plastic, and the image-side surface thereof has at least one convex shape in an off-axis region thereof; and
   a sixth lens element having a concave image-side surface in a paraxial region thereof; wherein both of an object-side surface and the image-side surface of the sixth lens element are aspheric, the sixth lens element is made of plastic, and the image-side surface thereof has at least one convex shape in an off-axis region thereof;
   wherein the image capturing optical system has a total of six lens elements;
   wherein an axial distance between the third lens element and the fourth lens element is T34, a central thickness of the fifth lens element is CT5, a curvature radius of the object-side surface of the sixth lens element is R11, a curvature radius of the image-side surface of the sixth lens element is R12, a sum of the central thicknesses of the first lens element, the second lens element, the third lens element, the fourth lens element, the fifth lens element, and the sixth lens element is ΣCT, an axial distance between the object-side surface of the first lens element and the image-side surface of the sixth lens element is Td, and the following conditions are satisfied:

$0.70 < T34/CT5$;

$-0.30 < (R11+R12)/(R11-R12)$; and $0.55 < \Sigma CT/Td < 0.95$.

2. The image capturing optical system of claim 1, wherein the axial distance between the third lens element and the fourth lens element is T34, the central thickness of the fifth lens element is CT5, and the following condition is satisfied:

$1.0 < T34/CT5 < 3.0$.

3. The image capturing optical system of claim 2, wherein the axial distance between the third lens element and the fourth lens element is T34, the central thickness of the fifth lens element is CT5, and the following condition is satisfied:

$1.25 < T34/CT5 < 2.50$.

4. The image capturing optical system of claim 2, wherein the second lens element has a concave image-side surface in a paraxial region thereof.

5. The image capturing optical system of claim 1, wherein the curvature radius of the image-side surface of the sixth lens element is R12, a curvature radius of the image-side surface of the fifth lens element is R10, a curvature radius of the image-side surface of the fourth lens element is R8, and the following condition is satisfied:

$0 < R12 < R10 < R8$.

6. The image capturing optical system of claim 5, wherein an Abbe number of the fifth lens element is V5, and the following condition is satisfied:

$V5<32$.

7. The image capturing optical system of claim 5, wherein a focal length of the image capturing optical system is f, an axial distance between the fifth lens element and the six lens element is T56, and the following condition is satisfied:

$12.5<f/T56<25.0$.

8. The image capturing optical system of claim 5, wherein the curvature radius of the object-side surface of the sixth lens element is R11, the curvature radius of the image-side surface of the sixth lens element is R12, and the following condition is satisfied:

$2.0<(R11+R12)/(R11-R12)$.

9. The image capturing optical system of claim 1, wherein the image capturing optical system further comprises a stop, an axial distance from the stop to the image-side surface of the sixth lens element is Sd, an axial distance between the object-side surface of the first lens element and the image-side surface of the sixth lens element is Td, and the following condition is satisfied:

$0.80<Sd/Td<1.10$.

10. The image capturing optical system of claim 9, wherein the central thickness of the fifth lens element is CT5, a central thickness of the sixth lens element is CT6, and the following condition is satisfied:

$0.25<CT5/CT6<0.75$.

11. The image capturing optical system of claim 9, wherein an f-number of the image capturing optical system is Fno, and the following condition is satisfied:

$1.6<Fno<2.5$.

12. The image capturing optical system of claim 1, wherein the fifth lens element has a convex object-side surface in a paraxial region thereof, and the sixth lens element has a convex object-side surface in a paraxial region thereof.

13. The image capturing optical system of claim 1, wherein the axial distance between the object-side surface of the first lens element and the image-side surface of the sixth lens element is Td, a half of the maximal field of view of the image capturing optical system is HFOV, and the following condition is satisfied:

$4.0 \text{ mm}<Td/\text{Tan(HFOV)}<7.5 \text{ mm}$.

14. The image capturing optical system of claim 1, wherein a focal length of the second lens element is f2, a focal length of any of the third lens element, the fourth lens element, the fifth lens element, and the sixth lens element is fx (i.e. x=3, 4, 5, or 6), and the following condition is satisfied:

$|f2|<|fx|$.

15. The image capturing optical system of claim 1, wherein a vertical distance between an optical axis and a critical point being the closest to an image surface and on the off-axis region of the image-side surface of the sixth lens element is Yc62, a vertical distance between an optical axis and a critical point being the closest to the image surface and on the off-axis region of the image-side surface of the fifth lens element is Yc52, and the following condition is satisfied:

$Yc62>Yc52$.

16. An image capturing device, comprising:
the image capturing optical system of claim 1; and
an image sensor.

17. A portable device, comprising:
the image capturing device of claim 16.

18. An image capturing optical system comprising, in order from an object side to an image side:
a first lens element with positive refractive power having a convex object-side surface in a paraxial region thereof;
a second lens element with negative refractive power having a concave image-side surface in a paraxial region thereof;
a third lens element;
a fourth lens element having a concave image-side surface in a paraxial region thereof;
a fifth lens element having a convex object-side surface in a paraxial region thereof and a concave image-side surface in a paraxial region thereof;
wherein both of the object-side surface and the image-side surface of the fifth lens element are aspheric, the fifth lens element is made of plastic, and the image-side surface thereof has at least one convex shape in an off-axis region thereof; and
a sixth lens element having a concave image-side surface in a paraxial region thereof; wherein both of an object-side surface and the image-side surface of the sixth lens element are aspheric, the sixth lens element is made of plastic, and the image-side surface thereof has at least one convex shape in an off-axis region thereof;
wherein the image capturing optical system has a total of six lens elements,
wherein an axial distance between the third lens element and the fourth lens element is T34, a central thickness of the fifth lens element is CT5, a curvature radius of the object-side surface of the sixth lens element is R11, a curvature radius of the image-side surface of the sixth lens element is R12, a sum of the central thicknesses of the first lens element, the second lens element, the third lens element, the fourth lens element, the fifth lens element, and the sixth lens element is ΣCT, an axial distance between the object-side surface of the first lens element and the image-side surface of the sixth lens element is Td, and the following conditions are satisfied:

$0.50<T34/CT5$;

$-0.30<(R11+R12)/(R11-R12)$; and $0.55<\Sigma CT/Td<0.95$.

19. The image capturing optical system of claim 18, wherein a focal length of the second lens element is f2, a focal length of any of the third lens element, the fourth lens element, the fifth lens element, and the sixth lens element is fx (i.e. x=3, 4, 5, or 6), and the following condition is satisfied:

$|f2|<|fx|$.

20. The image capturing optical system of claim 18, wherein the axial distance between the object-side surface of the first lens element and the image-side surface of the sixth lens element is Td, a half of the maximal field of view of the image capturing optical system is HFOV, and the following condition is satisfied:

$4.0 \text{ mm}<Td/\text{Tan(HFOV)}<7.5 \text{ mm}$.

21. The image capturing optical system of claim 18, wherein the axial distance between the third lens element and the fourth lens element is T34, the central thickness of the fifth lens element is CT5, and the following condition is satisfied:

$1.0 < T34/CT5 < 3.0$.

22. The image capturing optical system of claim 18, wherein the curvature radius of the image-side surface of the sixth lens element is R12, a curvature radius of the image-side surface of the fifth lens element is R10, a curvature radius of the image-side surface of the fourth lens element is R8, and the following condition is satisfied:

$0 < R12 < R10 < R8$.

23. The image capturing optical system of claim 18, wherein an f-number of the image capturing optical system is Fno, and the following condition is satisfied:

$1.6 < Fno < 2.5$.

24. The image capturing optical system of claim 18, wherein the central thickness of the fifth lens element is CT5, a central thickness of the sixth lens element is CT6, and the following condition is satisfied:

$0.25 < CT5/CT6 < 0.75$.

25. The image capturing optical system of claim 18, wherein a vertical distance between an optical axis and a critical point being the closest to an image surface and on the off-axis region of the image-side surface of the sixth lens element is Yc62, a vertical distance between an optical axis and a critical point being the closest to the image surface and on the off-axis region of the image-side surface of the fifth lens element is Yc52, and the following condition is satisfied:

$Yc62 > Yc52$.

26. An image capturing device, comprising:
the image capturing optical system of claim 18; and
an image sensor.

27. A portable device, comprising:
the image capturing device of claim 26.

* * * * *

UNITED STATES PATENT AND TRADEMARK OFFICE
CERTIFICATE OF CORRECTION

PATENT NO. : 9,588,318 B2
APPLICATION NO. : 14/470706
DATED : March 7, 2017
INVENTOR(S) : Wei-Yu Chen et al.

It is certified that error appears in the above-identified patent and that said Letters Patent is hereby corrected as shown below:

In the Claims

Column 39, Line 56, Claim 14 the formula reading:
$|f^2| < |fx|$.
Should read as follows:
-- $|f2| < |fx|$. --

Column 40, Line 59, Claim 19 the formula reading:
$|f^2| < |fx|$.
Should read as follows:
-- $|f2| < |fx|$. --

Signed and Sealed this
Seventh Day of November, 2017

Joseph Matal
*Performing the Functions and Duties of the*
*Under Secretary of Commerce for Intellectual Property and*
*Director of the United States Patent and Trademark Office*